(12) United States Patent
Hao et al.

(10) Patent No.: US 12,445,690 B2
(45) Date of Patent: Oct. 14, 2025

(54) DISPLAY APPARATUS

(71) Applicants: VIDAA USA, INC., Suwanee, GA (US); VIDAA (NETHERLANDS) INTERNATIONAL HOLDINGS B.V., Duiven (NL)

(72) Inventors: Yunying Hao, Suwanee, GA (US); Li Man, Suwanee, GA (US); Fang Yan, Suwanee, GA (US)

(73) Assignees: VIDAA USA, INC., Suwanee, GA (US); VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 36 days.

(21) Appl. No.: 18/270,101

(22) PCT Filed: Dec. 2, 2021

(86) PCT No.: PCT/US2021/061652
§ 371 (c)(1),
(2) Date: Jun. 28, 2023

(87) PCT Pub. No.: WO2022/120079
PCT Pub. Date: Jun. 9, 2022

(65) Prior Publication Data
US 2024/0323472 A1    Sep. 26, 2024

(30) Foreign Application Priority Data

Dec. 3, 2020 (CN) .......................... 202011396065.4
Dec. 3, 2020 (CN) .......................... 202011412511.6

(51) Int. Cl.
*H04N 21/485* (2011.01)

(52) U.S. Cl.
CPC ................................ *H04N 21/485* (2013.01)

(58) Field of Classification Search
CPC .................................................... H04N 21/485
See application file for complete search history.

(56) References Cited

U.S. PATENT DOCUMENTS 7,162,701 B1 * 1/2007 Seyffert ................ G06F 3/0482
707/999.102
2004/0027391 A1    2/2004 Tu
(Continued)

FOREIGN PATENT DOCUMENTS

CN    101661369 A    3/2010
CN    102270100 A    12/2011
(Continued)

OTHER PUBLICATIONS

European Search Report dated May 8, 2024, EP 21 90 1480.
(Continued)

*Primary Examiner* — Seth A Silverman
(74) *Attorney, Agent, or Firm* — Meunier Carlin & Curfman LLC

(57) ABSTRACT

A display apparatus in the embodiments of the present disclosure includes a display and a controller, where the controller is configured to: read a first position in response to a command for moving a focus frame, where the first position indicates a position of a control where the focus frame is about to move towards; generate a second position based on information of the first position; and control the display to present prompt information of a first control at the second position, where the first control is the control where the focus frame is about to move towards.

18 Claims, 24 Drawing Sheets

(56) References Cited

U.S. PATENT DOCUMENTS

| | | | |
|---|---|---|---|
| 2005/0076309 A1* | 4/2005 | Goldsmith | G06F 3/0482 715/825 |
| 2010/0058242 A1 | 3/2010 | Kimoto | |
| 2012/0096386 A1 | 4/2012 | Baumann et al. | |
| 2012/0188445 A1 | 7/2012 | Rodriguez et al. | |
| 2012/0192217 A1 | 7/2012 | Jeong et al. | |
| 2013/0347024 A1 | 12/2013 | Sugiue | |
| 2015/0189215 A1 | 7/2015 | Kameoka | |
| 2015/0242079 A1* | 8/2015 | Vernia | H04L 41/22 715/855 |
| 2017/0108996 A1* | 4/2017 | Baladi | G06F 3/0482 |
| 2017/0161084 A1* | 6/2017 | Spracklen | G06F 3/1462 |
| 2018/0181261 A1 | 6/2018 | Saurabh | |

FOREIGN PATENT DOCUMENTS

| | | |
|---|---|---|
| CN | 102523528 A | 6/2012 |
| CN | 102855064 A | 1/2013 |
| CN | 102855140 A | 1/2013 |
| CN | 103210654 A | 7/2013 |
| CN | 103517148 A | 1/2014 |
| CN | 103677493 A | 3/2014 |
| CN | 105792007 A | 7/2016 |
| CN | 107835461 A | 3/2018 |
| CN | 108737873 A | 11/2018 |
| CN | 109190006 A | 1/2019 |
| CN | 109917982 A | 6/2019 |
| JP | 2007041962 A | 2/2007 |

OTHER PUBLICATIONS

English translation of Chinese Office Action issued in CN202011396065. 4, mailed Mar. 22, 2023.

English translation of Chinese Office Action issued in CN202011396065. 4, mailed Sep. 9, 2022.

International Search Report issued in International Application No. PCT/US2021/061652, mailed Mar. 3, 2022.

Office Action dated Jan. 18, 2024 in Chinese Patent Application 202011412511.6.

* cited by examiner

DISPLAY APPARATUS

The present disclosure is a National Stage of International Application No. PCT/US2021/061652, filed Dec. 2, 2021, which claims priorities to the Chinese patent application No. 202011396065.4 filed on Dec. 3, 2020 and entitled "DISPLAY APPARATUS", and Chinese patent application No. 202011412511.6 filed on Dec. 3, 2020 and entitled "DISPLAY APPARATUS", which are incorporated herein by references in their entireties.

FIELD OF THE INVENTION

The present disclosure relates to the field of a display apparatus.

BACKGROUND OF THE INVENTION

A display apparatus may provide users with functions of playing audio, videos, pictures, and the like, and attracts extensive attention from the users. To improve user experience, some functions are added to the display apparatus to meet the requirements of different users. Generally, each function corresponds to one control, and the user may complete setting of a corresponding function through touching a control corresponding to the function.

SUMMARY OF THE INVENTION

According to an aspect of the present disclosure, a display apparatus is provided, including a display and a controller, where the controller may be configured to: read a first position in response to a command for moving a focus frame, where the first position indicates a position of a control where the focus frame is about to move towards; generate a second position based on information of the first position, where the first position and the second position are related; and control the display to present prompt information of a first control at the second position, where the first control is the control where the focus frame is about to move towards.

According to another aspect of the present disclosure, a display apparatus is provided, including a display and a controller, where the controller is configured to: control the display to present a menu list, where the menu list is provided with a plurality of controls with a same level, the controls are provided with configuration data, and the configuration data is stored as data in a tree-like structure according to a parent-child relationship among the corresponding controls; invoke subdata of configuration data of a first control in response to triggering of the first control from a user, where the first control is a control selected by the user; map the subdata to generate a next-level menu list; and control the display to present the next-level menu list.

In some embodiments, the controls include an operation control, a gray control, and a non-display control, where the operation control is a control presented in the menu list which can be operated by the user; the non-display control is a control not presented in the menu list, and the configuration data of the non-display control is provided with a first identifier; and the gray control is a control presented in the menu list which cannot be operated by the user, and the configuration data of the gray control is provided with a gray identifier.

In some embodiments, the controller is further configured to: write the subdata of the configuration data of the first control into a presentation list in response to the triggering of the first control from the user; and invoke the subdata from the presentation list.

In some embodiments, if a level of the first control is a level one, the controller is further configured to run an initialization function if the initialization function is recorded in the presentation list.

In some embodiments, in response to completion of running of the initialization function/if the initialization function is not recorded in the presentation list, the controller is further configured to: search the presentation list for the first identifier, where the first identifier is an identifier of the configuration data of the non-display control; if the first identifier is found, delete the configuration data corresponding to the first identifier; and map a next-level menu list by using remaining subdata.

In some embodiments, if the level of the first control is inferior or equal to level two, in response to the triggering of the first control from the user, the controller is further configured to: search the configuration data of the first control for the gray identifier, where the gray identifier is an identifier of the configuration data of the gray control; and if the gray identifier is found, control the display to present the first prompt information, where the first prompt information is used for prompting the first control being not available for operation and a function of the first control.

In some embodiments, if the gray identifier is not found, the controller is further configured to: search the configuration data of the first control for URL information; load a control interface corresponding to the URL information if the URL information is found; and control the display to present the control interface.

In some embodiments, if the URL information is not found, the controller is further configured to: read the subdata of the configuration data of the first control; delete the configuration data recorded in the presentation list if the subdata is obtained; and write the subdata into the presentation list in response to completion of deletion of the configuration data.

In some embodiments, the controller is further configured to: counts presentation duration of the first prompt information; and control the display to cancel the first prompt information if the presentation duration is equal to a preset duration.

In some embodiments, the controller is further configured to: in response to the triggering of the first control from the user, control a focus frame to move; read a first position, where the first position indicates a position of a control where the focus frame is about to move towards; generate a second position based on information of the first position, where the first position and the second position are related; and control the display to present prompt information of the first control at the second position, where the first control is the control where the focus frame is about to move towards.

DETAILED DESCRIPTION OF THE EMBODIMENTS

To make objectives and implementations of the present disclosure more clear, the exemplary implementations of the present disclosure will be clearly and completely described below with reference to the accompanying drawings for the exemplary embodiments of the present disclosure. Apparently, the exemplary embodiments described herein are merely part and not all of the embodiments of the present disclosure.

It should be noted that brief descriptions of the terms in the present disclosure are merely for ease of understanding the implementations described below, not intended to limit the implementations of the present disclosure. Unless otherwise stated, these terms should have common and ordinary meanings as understood by one of ordinary skills in the art.

The terms such as "first", "second", and "third" in the description, the claims, and the foregoing accompanying drawings of the present disclosure are used to distinguish between similar objects or entities, and are not necessarily used to limit a particular sequence or a sequential order, unless otherwise noted. It should be understood that terms herein may be used interchangeablely in suitable cases.

The terms "including", "having", and any variant thereof are intended to indicate existence of listed elements, not excluding a possibility of existence or addition of other elements. For example, products or devices including a series of components are not necessarily limited to including only all the components that are clearly listed, but may include other components that are not clearly listed or are inherent to the product or device.

Figure 1:
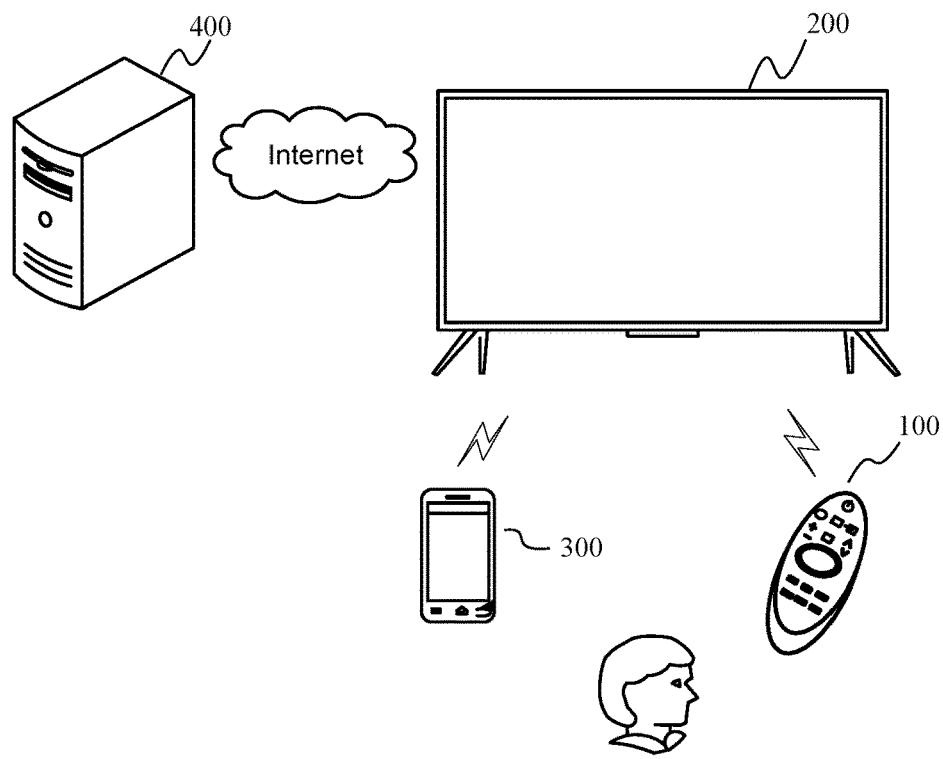
FIG. 1 shows a use scenario of a display apparatus according to some embodiments.

FIG. 1 shows a schematic diagram illustrating a use scenario of a display apparatus according to some embodiments. As shown in FIG. 1, a display apparatus 200 performs data communications with a server 400, and a user may operate the display apparatus 200 by using a smart device 300 or a control device 100.

In some embodiments, the control device 100 may be a remote control. Communications between the remote control and the display apparatus includes infrared protocol communication or Bluetooth protocol communication, and at least one of other short-distance communication manners. The display apparatus 200 is controlled in a wireless or wired way. The user may control the display apparatus 200 by inputting a user command through at least one of key input on the remote control, voice input, and control-panel input.

In some embodiments, the smart device 300 may include any one of a mobile terminal, a tablet, a computer, a notebook, or an AR/VR device.

In some embodiments, the display apparatus 200 may also be controlled by using the smart device 300. For example, the display apparatus 200 is controlled by using an application running on the smart device.

In some embodiments, the display apparatus 200 may receive a command not by the foregoing smart device 300 or the control device 100, but be controlled by user touch or gestures.

In some embodiments, data communications may also be performed between the display apparatus 200 and the smart device 300.

In some embodiments, the display apparatus 200 may also be controlled through manners other than the control apparatus 100 and the smart device 300. For example, display apparatus 200 may be controlled by directly receiving a voice command from the user through a voice command obtaining module provided within the display apparatus 200, or may be controlled by receiving a voice command from the user through a voice control device provided outside the display apparatus 200.

In some embodiments, the display apparatus 200 also performs data communications with the server 400. The display apparatus 200 may be allowed to perform communication connections through a local area network (LAN), a wireless local area network (WLAN), and other networks. The server 400 may provide various contents and interactions for the display apparatus 200. The server 400 may be a cluster or a plurality of clusters, and may include one or multiple types of servers.

In some embodiments, as required, software steps executed by one body may be migrated to another body that performs data communications with the former for execution. For example, as required, software steps executed by the server may be performed by the display apparatus that performs data communications with the server, and vice versa.

Figure 2:
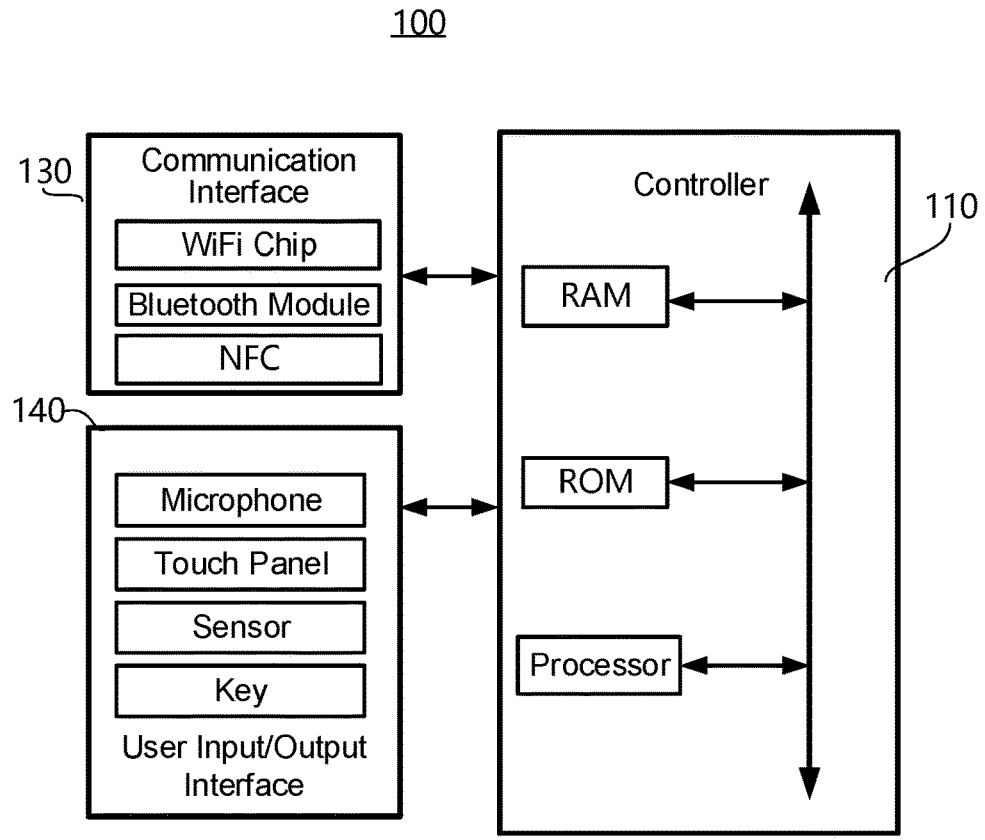
FIG. 2 shows a block diagram illustrating a hardware configuration of a control device 100 according to some embodiments.

FIG. 2 shows a block diagram illustrating a hardware configuration of a control device 100 according to some embodiments. As shown in FIG. 2, the control device 100 includes a controller 110, a communication interface 130, a user input/output interface 140, a memory, and a power supply. The control device 100 may receive a command input from the user, and convert the command into an instruction that the display apparatus 200 can recognize and respond to, serving as an intermediary for interaction between the user and the display apparatus 200.

In some embodiments, the communication interface 130 is configured to communicate with the outside, and includes a WIFI chip, a Bluetooth module, an NFC, or at least one of alternative modules.

In some embodiments, the user input/output interface 140 includes a microphone, a touch panel, a sensor, a key, or at least one of alternative modules.

Figure 3:
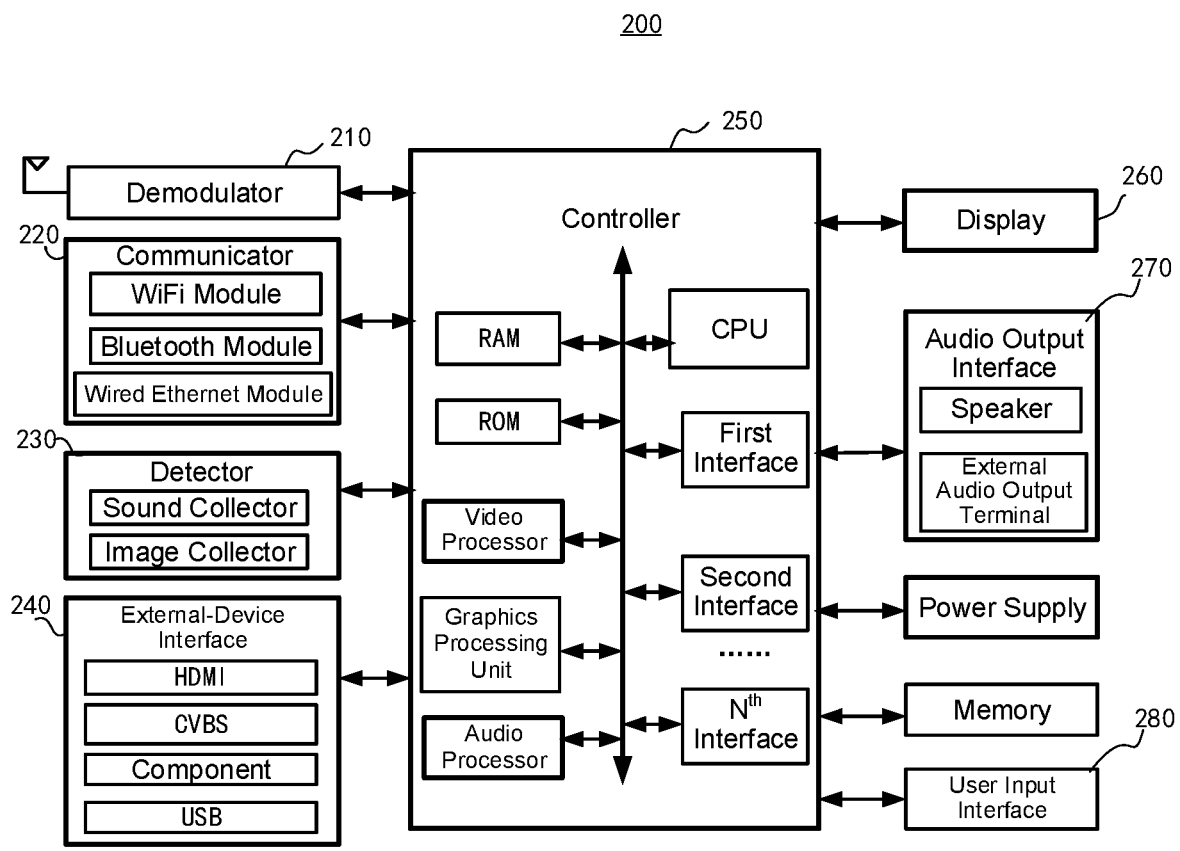
FIG. 3 shows a block diagram illustrating a hardware configuration of a display apparatus 200 according to some embodiments.

FIG. 3 shows a block diagram illustrating a hardware configuration of a display apparatus 200 according to some embodiments.

In some embodiments, the display apparatus 200 includes at least one of a demodulator 210, a communicator 220, a detector 230, an external-device interface 240, a controller 250, a display 260, an audio output interface 270, a memory, a power supply, and a user input interface.

In some embodiments, the controller includes a central processing unit, a video processor, an audio processor, a graphics processing unit, a RAM, a ROM, and first to n$^t$h interfaces for input/output.

In some embodiments, the display 260 includes a panel component for presenting images and a driving component for driving image display, and is configured to receive image signals output from the controller to display video content, image content, components on a menu control interface, a user-control UI interface, and the like.

In some embodiments, the display 260 may be at least one of a liquid crystal display, an OLED display, and a projection display, and may alternatively be a projection device and a projection screen.

In some embodiments, the demodulator 210 receives a broadcast television signal in a wired or wireless way, and demodulates audio and video signals, such as EPG data signals, from a plurality of wireless or wired broadcast television signals.

In some embodiments, the communicator 220 is a component for communicating with an external device or a server according to various communication protocol types.

In some embodiments, the detector 230 is configured to acquire a signal from an external environment or a signal interacting with the outside. For example, the detector 230 includes an optical receiver and a sensor configured to acquire intensity of ambient light. Alternatively, the detector 230 includes an image collector, such as a camera, and may be configured to collect an external environmental scene and user attributes or user gestures for interaction. Alternatively, the detector 230 includes a sound collector, such as a microphone, configured to receive sound from the outside.

In some embodiments, the external-device interface 240 may include, but not limited to any one or more of a high definition multimedia interface (HDMI), an analog or data high-definition component input interface (component), a composite video broadcast signal input interface (CVBS), a USB input interface (USB), an RGB port, and the like.

In some embodiments, the controller 250 and the demodulator 210 may be located in different separate devices. To be specific, the demodulator 210 may be in an external device of a main device where the controller 250 is located, such as an external set-top box.

In some embodiments, the controller 250 controls operation of the display apparatus and responds to operations from the user through various software control programs stored in the memory. The controller 250 controls overall operations of the display apparatus 200. In some embodiments, the controller includes at least one of a central processing unit (CPU), a video processor, an audio processor, a graphics processing unit (GPU), a RAM (random access memory), a ROM (read-only memory), first to n$^{th}$ interfaces for input/output, and a communications bus.

In some embodiments, the graphics processing unit is configured to generate various graphics objects, such as at least one of an icon, an operation menu, and a graphic displayed based on commands from the user. The graphics processing unit includes an arithmetic unit, to perform operations by receiving various interaction instructions input from the user, and display various objects according to display attributes; and further includes a renderer, to render various objects obtained by using the arithmetic unit. The rendered object is displayed on the display.

In some embodiments, the video processor is configured to receive an external video signal, and perform video processings according to a standard coding/decoding protocol of the input signal. In this way, a signal that can be directly displayed or played on the display apparatus 200 may be obtained.

In some embodiments, the audio processor is configured to receive an external audio signal, and perform processings according to a standard coding/decoding protocol of the input signal to obtain a sound signal that can be played in a speaker.

In some embodiments, the user may input a user command based on a graphical user interface (GUI) displayed on the display 260, and the user input interface receives the input user command through the graphical user interface (GUI). Alternatively, the user may input a user command by inputting specific voice or a specific gesture, and the user input interface may receive the user input command by recognizing the voice or the gesture through a sensor.

In some embodiments, the user input interface 280 is an interface configured to receive control input (for example, a physical button on a display apparatus body, or the like).

Generally, a display apparatus is configured with hundreds of functions, and hundreds of controls may be presented on respective pages of the display apparatus. To ensure that associated controls can be displayed on a same page, an area of the control needs to be limited. As a result, content shown on the control is limited so that a user cannot clearly understand a function corresponding to each control, leading to poor user experience.

Figure 4A:
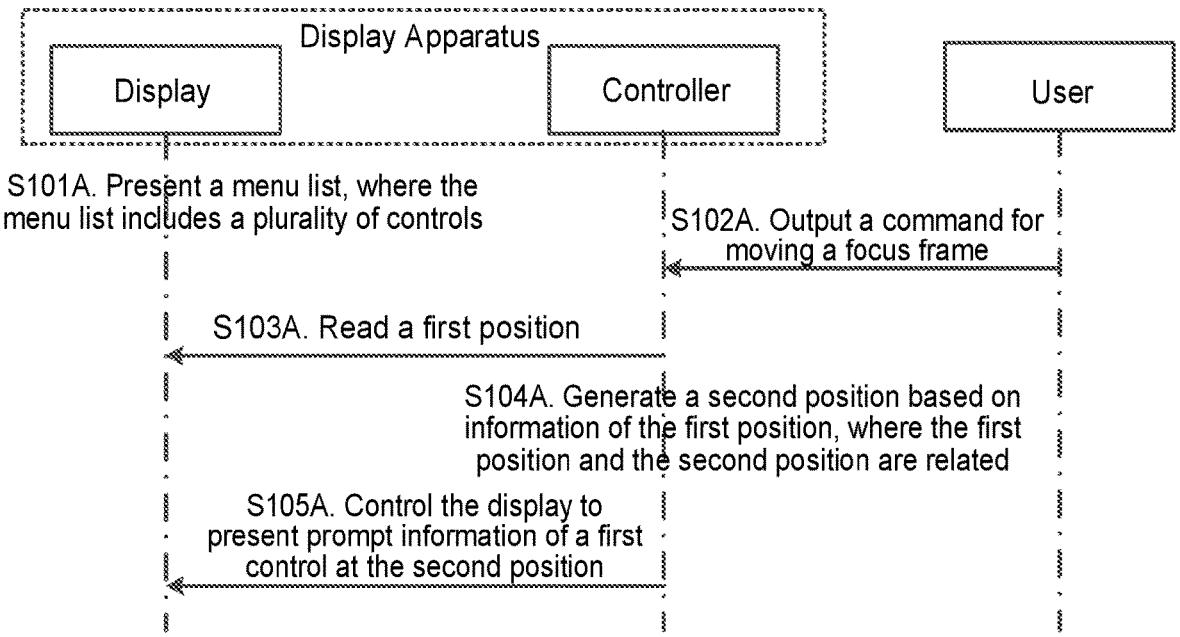
FIG. 4A is a flowchart illustrating an interaction between a display apparatus and a user according to some embodiments.

In view of the above issues, embodiments of the present disclosure provide a display apparatus. The display apparatus includes at least a display and a controller. For a flowchart illustrating an interaction between the display apparatus and the user, reference may be made to FIG. 4A.

The display is configured to perform step S101A to present a menu list.

Figure 5:
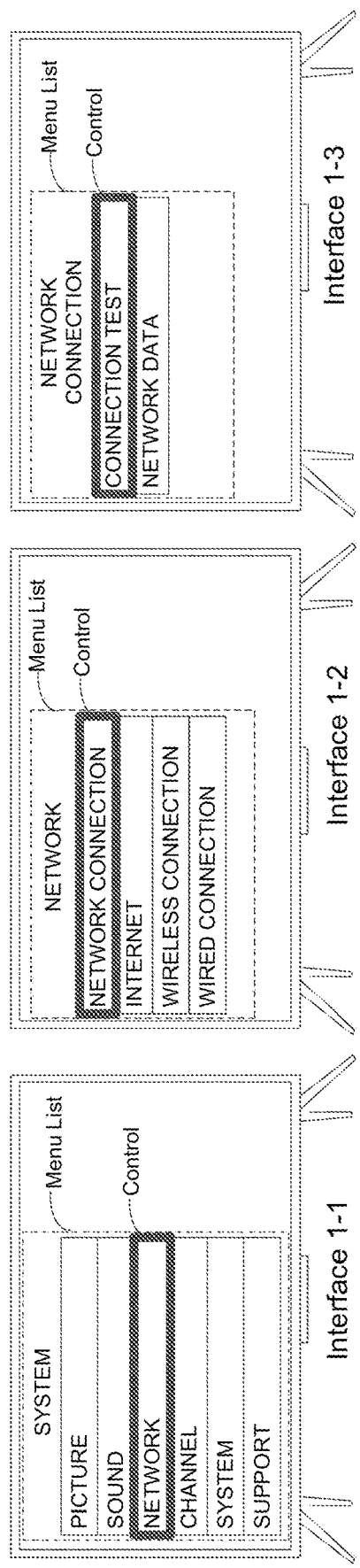
FIG. 5 is a schematic diagram illustrating a presentation interface of a display when the display presents a menu list according to some embodiments.

FIG. 5 is a schematic diagram illustrating a presentation interface of a display when the display presents a menu list according to some embodiments. A menu list may be presented in a form of a floating window, and includes at least a control.

Display apparatuses may use an Android UI system. In the Android UI system, the control is used as a basic display unit, and each control has an attribute: focus. There are only two focus states for each control: having focus or not having focus. A control having a focus does not change in appearance by default. In order to tell a user which control currently has a focus, a focus frame is shown on the control. Therefore, as the focus moves, the focus frame moves to fall on a control that newly obtains the focus.

For example, an interface 1-1 in FIG. 5 is a presentation interface of the display when a control for NETWORK obtains a focus. It may be seen from the interface 1-1 that the focus frame appears on the control for NETWORK.

Generally, there is a "parent-child" relationship among various controls. In actual application, the controls may be classified into a level-one control, a level-two control, a level-three control, . . . according to the parent-child relationship among the controls. The level-one control, without a parent control (superior control), is a control configured in a setting menu. Typically, the level-one control may be directly invoked by the user. The level-two control is a sub-control (an inferior control) of the level-one control, and a corresponding level-two control may be invoked through the level-one control by the user. Specifically, when the user clicks on a level-one control, the display may present a menu list corresponding to the level-one control, which includes a sub-control of the level-one control. For example, when the user clicks on the control for NETWORK (level-one control), the controller controls the display to present a menu list of the control for NETWORK, where reference may be made to an interface 1-2 in FIG. 5 for details. The menu list of the control for NETWORK includes a control for NETWORK CONNECTION, a control for INTERNET, a control for WIRE CONNECTION, and a control for WIRELESS CONNECTION. The level-three control is a sub-control (an inferior control) of the level-two control. The user needs to invoke a corresponding level-two control through the level-one control, and then invoke the corresponding level-three control through the level-two control. For example, when the user clicks on the control for NETWORK (level-one control), the controller controls the display to present the menu list of the control for NETWORK, where reference may be made to the interface 1-2 in FIG. 5 for details. When the user clicks on the control for NETWORK CONNECTION (level-two control), the controller controls the display to present a menu list of the control for NETWORK CONNECTION, where reference may be made to an interface 1-3 in FIG. 5 for details. The menu list of the control for NETWORK CONNECTION includes a control for CONNECTION TEST and a control for NETWORK DATA.

Levels of controls included in the display apparatus are not limited in the embodiments. In actual application, corresponding levels of controls may be provided according to requirements, which is not limited herein.

As required, step S102A is performed to output a command for moving the focus frame from the user.

An output form of the command for moving the focus frame is not limited in the embodiments. For example, in some embodiments, the command for moving the focus frame may be outputted through a remote control from the user. For another example, in some embodiments, the controller may be installed with voice assistant software, and correspondingly, the user may directly output the command for moving the focus frame. In actual application, ways of outputting the command for moving the focus frame may include, but not limited to the foregoing two ways.

In response to the command for moving the focus frame, the controller is configured to perform step S103A to read a first position. The first position indicates a position, where the focus frame is about to move, in the presentation interface of the display.

Figure 6:
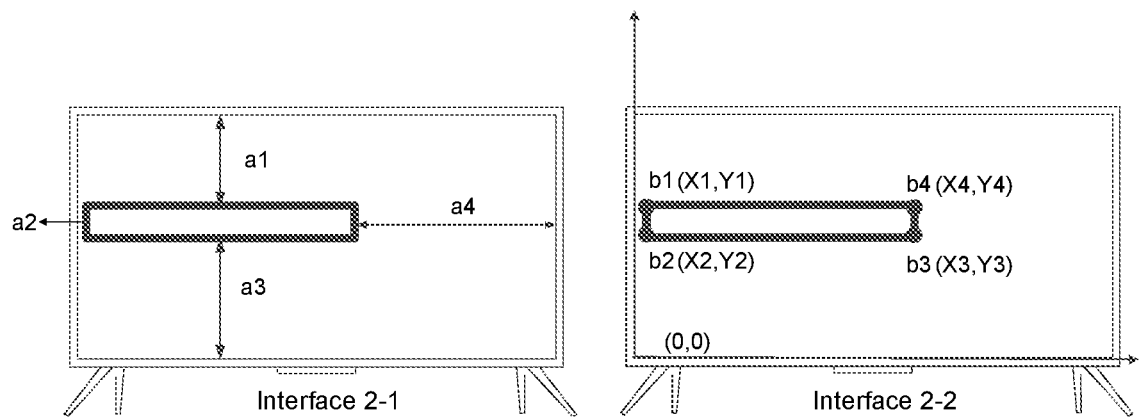
FIG. 6 is a schematic diagram illustrating a presentation interface of a display according to some embodiments.

The first position may be represented in various forms. For example, in some embodiments, the first position may be represented by distances from four boundaries of the focus frame (a top edge, a left edge, a bottom edge, and a right edge) to corresponding boundaries of a presentation area of the display. For details, reference may be made to an interface 2-1 in FIG. 6. The first position may be represented by (a1, a2, a3, a4), where a1 indicates a distance from the top edge of the focus frame to a top edge of the presentation area; a2 indicates a distance from the left edge of the focus frame to a left edge of the presentation area; a3 indicates a distance from the bottom edge of the focus frame to a bottom edge of the presentation area; and a4 indicates a distance from the right edge of the focus frame to a right edge of the presentation area. For another example, in some embodiments, the first position may be represented by a coordinate value of four vertexes (an upper left vertex, a lower left vertex, a lower right vertex, and an upper left vertex) of the focus frame. In the embodiments, an origin of a coordinate system is not limited. In some embodiments, any vertex of a display may be used as an origin of a coordinate system. For example, regarding an interface 2-2 in FIG. 6, a lower left vertex of the display is used as the origin to create a Cartesian coordinate system. In the Cartesian coordinate system, coordinates of the four vertices of the focus frame respectively are b1 (X1, Y1), b2 (X2, Y2), b3 (X3, Y3), and b4 (X4, Y4). In actual application, the first position may be expressed in other ways according to requirements on subsequent calculations, which is not limited herein.

In actual application, in order to reduce a data processing load for the controller, some scenarios are limited in the embodiments of the present disclosure. In these scenarios, the controller may not read the first position, so as to reduce the data processing load for the controller, thereby increasing an operating speed of the entire display apparatus.

Figure 7:
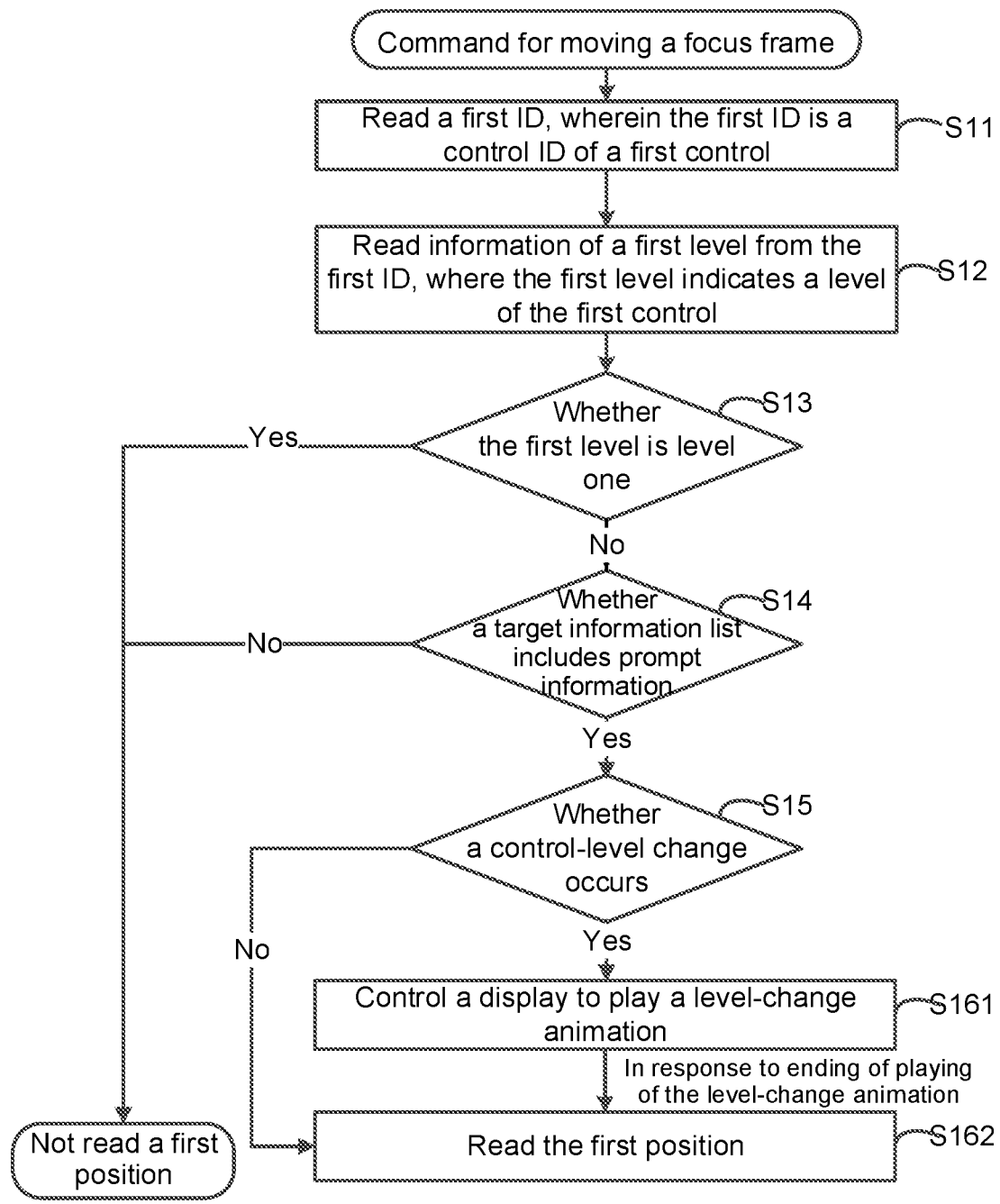
FIG. 7 is a flowchart illustrating a way of reading a first position according to some embodiments.

In view of the above issue, embodiments of the present disclosure provide a way of reading the first position. For details, reference may be made to FIG. 7. FIG. 7 is a flowchart illustrating a way of reading a first position according to some embodiments, where the controller is configured to perform steps S11 to S162.

S11. Read a first ID, wherein the first ID is a control ID of a first control.

In the present disclosure, all controls are configured with configuration information, where the configuration information may include, but not limited to an attribute of the control, a control ID of the control, and prompt information of the control. The configuration information is stored in an information list. A level of the control may be determined based on the control ID.

S12. Read information of a first level from the first ID, where the first level indicates a level of the first control.

According to the embodiment, the first position is read for subsequently calculating of a presentation position of the prompt information (which may also be referred to as a second position in the embodiments) by using the first position. However, a level-one control is not configured with prompt information. When the first control is a level-one control, if the controller still reads the first position, it is obvious that computational resources of the controller are wasted. In view of the above, in the embodiments of the present disclosure, the controller determine in advance whether the first control is a level-one control, and then determines whether to read the first position based on a determination result, thereby reducing the data processing load for the controller.

S13. Determine whether the first level is a level one, and not read the first position if the first level is the level one.

There are a lot of implementation manners for determining whether the first level is the level one. For example, in some embodiments, IDs of different levels of controls may be set to have different lengths, and then it may be determined, based on a number of characters included in the control ID, what level the control is. For example, in some embodiments, the control ID of the level-one control includes A characters, the control ID of the level-two control includes B characters, and the control ID of the level-three control includes C characters . . . . The controller may determine the first level based on the number of the characters included in the control ID. For another example, in some embodiments, different identifiers may be set for IDs of different levels of controls, and then whether the control is a level-one control may be determined based on the identifier included in the control ID. For example, in some embodiments, the control ID of the level-one control includes an identifier A, the control ID of the level-two control includes an identifier B, and the control ID of the level-three control includes an identifier C . . . . The controller may determine whether the control is a level-one control based on the identifier included in the control ID.

In actual application, implementation manners for determining whether the first level is the level one may include, but not limited to the foregoing two manners.

It should be noted that, in actual application, the level of the first control may also be determined in manners other than the control ID, which are not described in detail herein. Nevertheless, it should be understood that all examples in which the first position is not read after it is determined that the first control is a level-one control fall within the protection scope of the present disclosure.

If the first level is not the level one, proceed to step S14 to determine whether the prompt information may be obtained from a target information list, where the target information list is an information list of the first control. The first position is not read if no prompt information is obtained.

According to the embodiments, the first position is read for subsequently calculating of the presentation position of the prompt information by using the first position. However, in a scenario where no prompt information is included in the information list of the first control, if the controller still reads the first position, it is obvious that the computational resources of the controller are wasted. In view of the above issue, in the embodiments of the present disclosure, the controller determine in advance whether the prompt information may be obtained from the target information list, and then determines whether to read the first position based on a determination result, thereby reducing the data processing load for the controller.

There are a lot of implementation manners for determining whether the prompt information may be obtained from the target information list. For example, in some embodiments, the prompt information may be stored at a specific position in the target information list. When it is determined that the first control is not a level-one control, the controller directly reads data from the specific position in the target information list. Based on whether the data is obtained from the specific position, the controller determines whether the prompt information may be obtained from the target information list. For example, in some embodiments, the specific position may be a storage area for $N_{th}$ to $M^{th}$ characters in the target information list. During a process of configuring the target information list, a designer may write the prompt information of the first control to the storage area for the $N^{th}$ to $M^{th}$ characters. When it is determined that the first control is not a level-one control, the controller directly reads the prompt information from the storage area for the $N^{th}$ to $M^{th}$ characters in the target information list. If data is obtained, it means that the prompt information is recorded in the target information list; and if the data is not obtained, it means that the prompt information is not recorded in the target information list. For another example, in some embodiments, the prompt information may be configured with an identifier, and the controller may determine whether the target information list includes the prompt information based on whether the identifier of the prompt information is obtained. For example, in some embodiments, the identifier of the prompt information is identifier A. When it is determined that the first control is not a level-one control, the controller searches the target information list for the identifier A. If the identifier A is found, it means that the prompt information is recorded in the target information list, and if the identifier A is not found, it means that the prompt information is not recorded in the target information list.

In actual application, implementation manners for determining whether the prompt information is included in the target information list may include, but not limited to the foregoing two manners.

When the user invokes different levels of controls, the focus frame may move between the different levels of controls. For example, referring to FIG. 5 again, in an initial state, the focus frame falls on the control for NETWORK (level-one control). To invoke the control for NETWORK CONNECTION (level-two control), the user needs to trigger the control for NETWORK. During a process of controlling the focus frame to skip from the control for NETWORK to the control for NETWORK CONNECTION, presentation content of the display skips from a menu for SYSTEM to a menu for NETWORK. That the presentation content of the display skips from the menu for SYSTEM to the menu for NETWORK may be referred to as a level-change animation in the embodiments. In the foregoing process, it needs to take certain time to map an interface for the menu for NETWORK in a UI interface. Therefore, the information of the first position cannot be obtained immediately by the controller. When the user invokes a same level of controls, there is no need to map a new menu interface in the UI interface. In this scenario, the first position may be obtained immediately by the controller. To ensure that the controller may determine time of reading the first position, in the embodiments of the present disclosure, the controller may determine the time of reading the first position based on whether a control-level change occurs.

If the prompt information is obtained, proceed to step S15 to determine, by the controller, whether the control-level change occurs.

There are a lot of manners for determining whether the control-level change occurs.

For example, in some embodiments, whether the control-level change occurs may be determined based on the control ID. Specifically, in some embodiments, in response to an instruction for moving a focus, the controller may read the first level of the first control where the focus frame is about to move towards, where the focus frame is to move from a second control with a second level to the first control. The controller may determine whether the control-level change occurs based on whether the first level is consistent with the second level. For example, in some embodiments, the second level is the level two and the first level is the level three. In this case, it may be determined by the controller that the control-level change occurs. In some embodiments, the instruction for moving a focus may be implemented by a command for moving a focus frame. In other embodiments, the instruction for moving a focus may be implemented by other forms, such as voice control.

For another example, in some embodiments, instructions for moving the focus may be distinguished from one another. An instruction for moving the focus corresponding to a process of controlling the focus to move between controls with a same level is referred to as a first instruction, and an instruction for moving the focus corresponding to a process of controlling the focus to move between controls with different levels is referred to as a second instruction, where the first instruction is different from the second instruction. In response to the first instruction, it is determined by the controller that the control-level change does not occur. In response to the second instruction, it is determined by the controller that the control-level change occurs.

In actual application, implementation manners for determining whether the control-level change occurs may include, but not limited to the foregoing two manners.

If the control-level change occurs, proceed to step S161 to control the display to play the level-change animation.

In response to ending of playing of the level-change animation/that the level of the control does not change, proceed to step S162 to read the first position.

The controller is configured to perform step S104A to generate a second position based on the information of the first position, where the first position and the second position are related.

Figure 8:
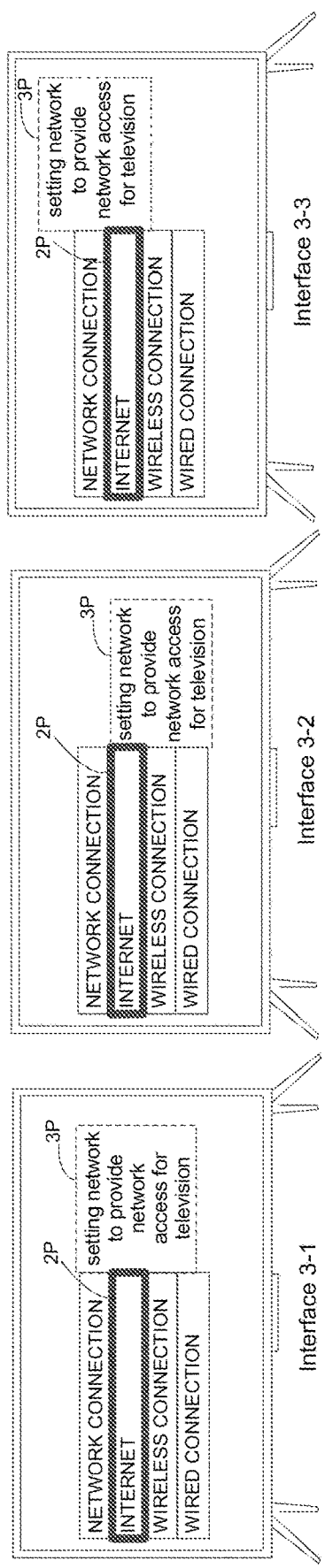
FIG. 8 is a schematic diagram illustrating a presentation interface of a display according to some embodiments.

In the embodiments of the present disclosure, the first position and the second position are related. The relation between the first position and the second position may indicate that the center of the first position and the center of the second position are at a same level. For details, reference may be made to an interface 3-1 in FIG. 8. FIG. 8 is a schematic diagram illustrating a presentation interface of a display according to some embodiments. It may be seen from the interface 3-1 that a center of a first position 2P and a center of a second position 3P are at a same level. The relation between the first position and the second position may indicate that a top edge of the first position and a top edge of the second position are at a same level. For details, reference may be made to an interface 3-2 in FIG. 8. It may be seen from the interface 3-2 that the top edge of the first position and the top edge of the second position are at a same level. The relation between the first position and the second position may indicate that a bottom edge of the first position and a bottom edge of the second position are at a same level. For details, reference may be made to an interface 3-3 in FIG. 8. It may be seen from the interface 3-3 that the bottom edge of the first position and the bottom edge of the second position are at a same level.

Regarding the relation between the first position and the second position, only three relationships are illustrated in the embodiments of the present disclosure. In actual application, the relation between the first position and the second position may include, but not limited to the foregoing three relationships.

Figure 9:
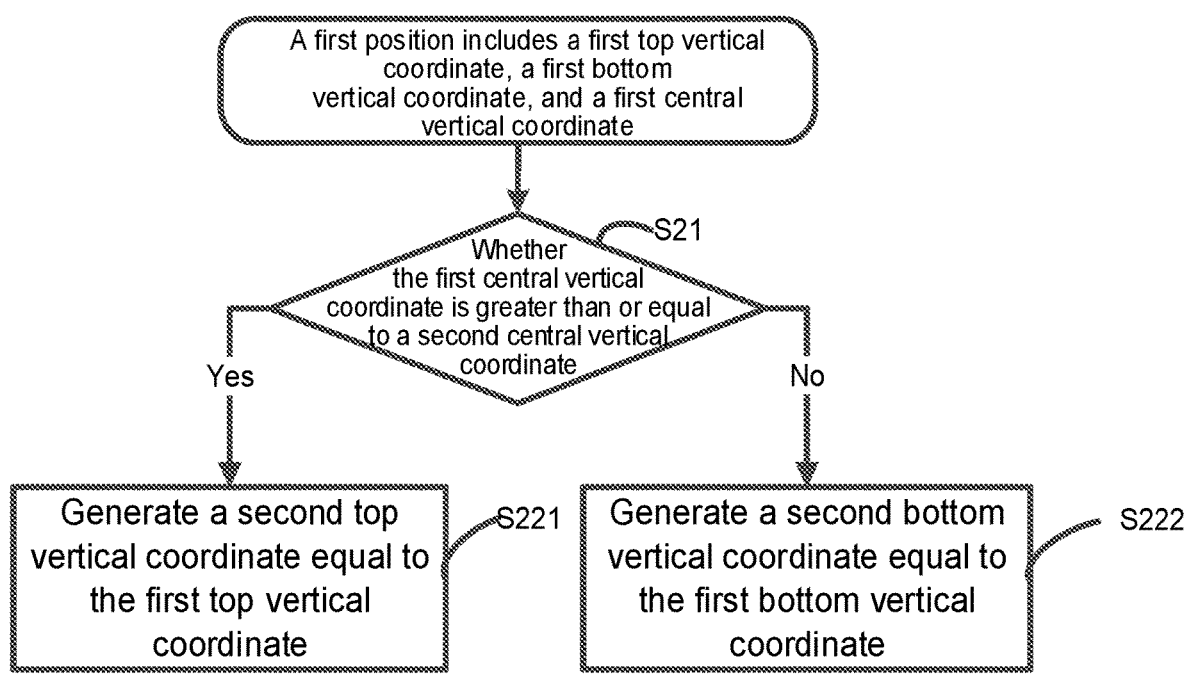
FIG. 9 is a flowchart illustrating a way of generating a second position according to some embodiments.

In the embodiments, the second position is the presentation position (which may also be referred to as an area) of the prompt information. In some embodiments, the second position may have a constant width. To obtain a presentation area (the second position) that is large as possible for presenting the prompt information, a method for generating the second position is provided in some embodiments of the present disclosure. For details, reference may be made to FIG. 9. FIG. 9 is a flowchart illustrating a way of generating a second position according to some embodiments, where the controller is configured to perform steps S21 to S221/S222.

Step S21. Determine whether a first central vertical coordinate is greater than or equal to a second central vertical coordinate.

The Cartesian coordinate system in the embodiments may take any vertex of the display as an origin of the coordinate system. The first position may include a first top vertical coordinate, a first bottom vertical coordinate, and a first central vertical coordinate, where the first top vertical coordinate indicates a vertical coordinate of the top edge of the first position; the first bottom vertical coordinate indicates a vertical coordinate of the bottom edge of the first position; and the first central vertical coordinate indicates a vertical coordinate of the center of the first position. In the present disclosure, the first position is a position of a control where the focus frame is about to move towards, i.e., a position of the first control. The second central vertical coordinate indicates a vertical coordinate of a center of a presentation interface of the display.

If the first central vertical coordinate is greater than or equal to the second central vertical coordinate, proceed to step S221 to generate a second top vertical coordinate equal to the first top vertical coordinate, where the second top vertical coordinate indicates a vertical coordinate of a top edge of the second position.

If the first central vertical coordinate is smaller than the second central vertical coordinate, proceed to step S222 to generate a second bottom vertical coordinate equal to the first bottom vertical coordinate, where the second bottom vertical coordinate indicates a vertical coordinate of a bottom edge of the second position.

Figure 10A:
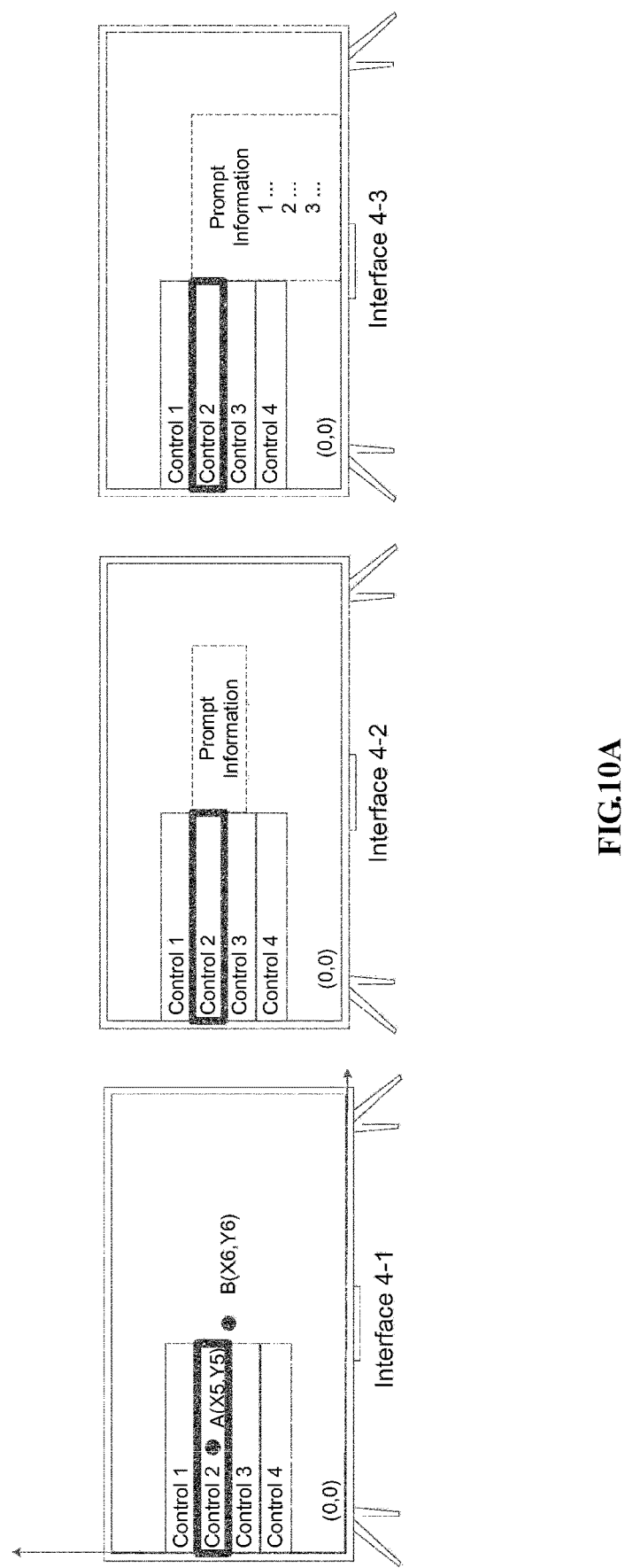
FIG. 10A is a schematic diagram illustrating a change of a presentation interface of a display according to some embodiments.

For example, FIG. 10A is a schematic diagram illustrating a change of a presentation interface of a display according to some embodiments. In an interface 4-1 in FIG. 10A, a control 2 is the first control, and the focus frame falls on the control 2. The coordinate system in the embodiments takes a lower left corner of the display as an origin, takes a line along a lower edge of the display as an X axis, and takes a line along a left edge of the display as a Y axis. A coordinate of the center of the first position is A (X5, Y5), and a coordinate of a center of the representation interface of the display is B (X6, Y6). In the present disclosure, the controller compares Y6 with Y5. If Y5>Y6, the top vertical coordinate of the second position is generated to be equal to the top vertical coordinate of the first position. For specific visual effects, reference may be made to an interface 4-2 in FIG. 10A. It may be seen from FIG. 10A that a presentation position of the focus frame and the presentation position of the prompt information have top edges at the same level. In some embodiments, if the prompt information includes more content, the prompt information may be presented in an area from the top edge of the presentation position downwards until an edge of the display. For details, reference may be made to an interface 4-3 in FIG. 10A.

Figure 10B:
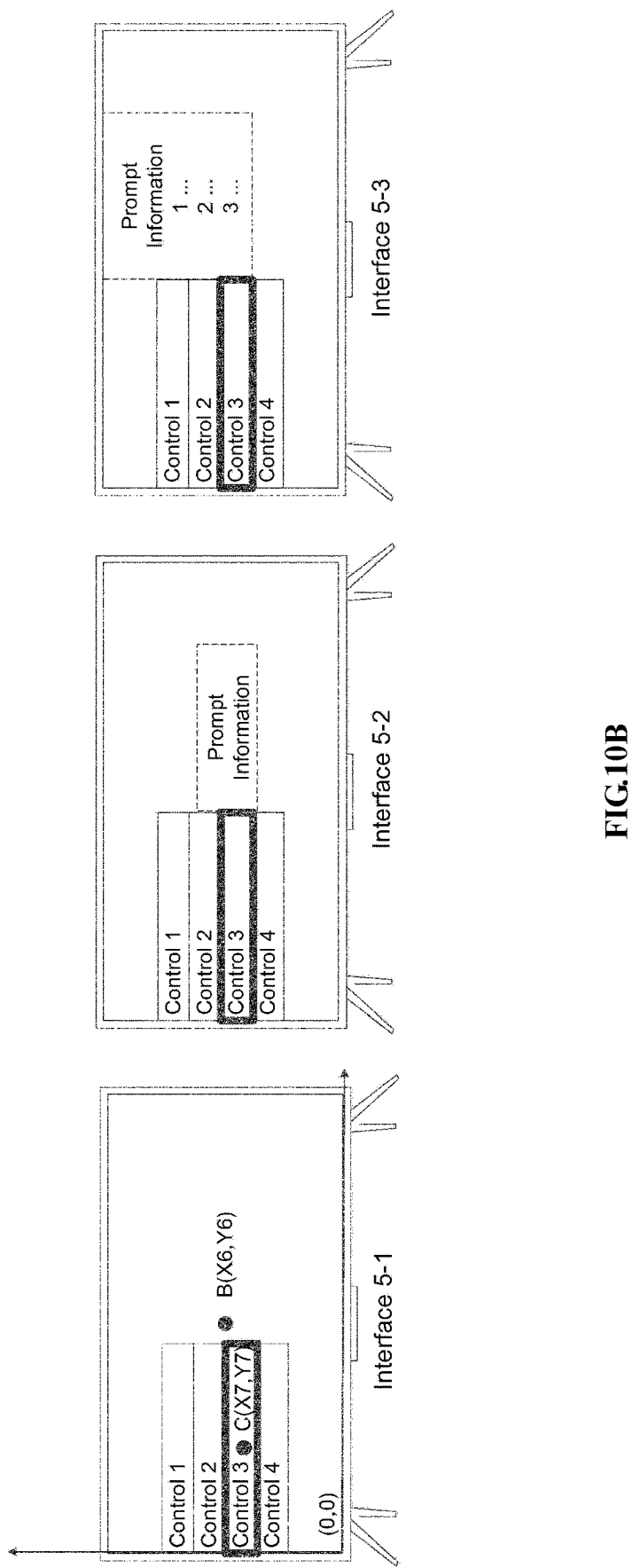
FIG. 10B is a schematic diagram illustrating a change of a presentation interface of a display according to some embodiments.

For example, FIG. 10B is a schematic diagram illustrating a change of a presentation interface of a display according to some embodiments. In an interface 5-1 in FIG. 10B, a control 3 is the first control, and the focus frame falls on the control 3. A coordinate of the center of the first position is C (X7, Y7), and a coordinate of the center of the presentation interface of the display is B (X6, Y6). In the present disclosure, the controller compares Y6 with Y7. If Y7<Y6, the vertical coordinate of the bottom edge of the second position is generated to be equal to the vertical coordinate of the bottom edge of the first position. For specific visual effects, reference may be made to an interface 5-2 in FIG. 10B. It may be seen from FIG. 10B that the presentation position of the focus frame and the presentation position of the prompt information have the bottom edges at the same level. In some embodiments, if the prompt information includes more content, the prompt information may be presented in an area from the bottom edge of the presentation position upwards until the edge of the display. For details, reference may be made to an interface 5-3 in FIG. 10B.

Text in most languages is displayed from left to right, and controls on a display applied in these countries usually are also displayed on the left (these languages may be referred to as a first language in the embodiments). However, text in some languages is typically displayed from right to left, for example, the Hebrew, the Persian, and the Arabic (these languages may be referred to a second language in the embodiments). The text in these languages is typically displayed from right to left. To satisfy requirements of more users, in the embodiments of the present disclosure, languages applied to the display are classified into a first language and a second language. When a current language of the display apparatus is the first language, the control is displayed on a left side of the presentation interface; and when the current language of the display apparatus is the second language, the control is displayed on a right side of the presentation interface.

Figure 11:
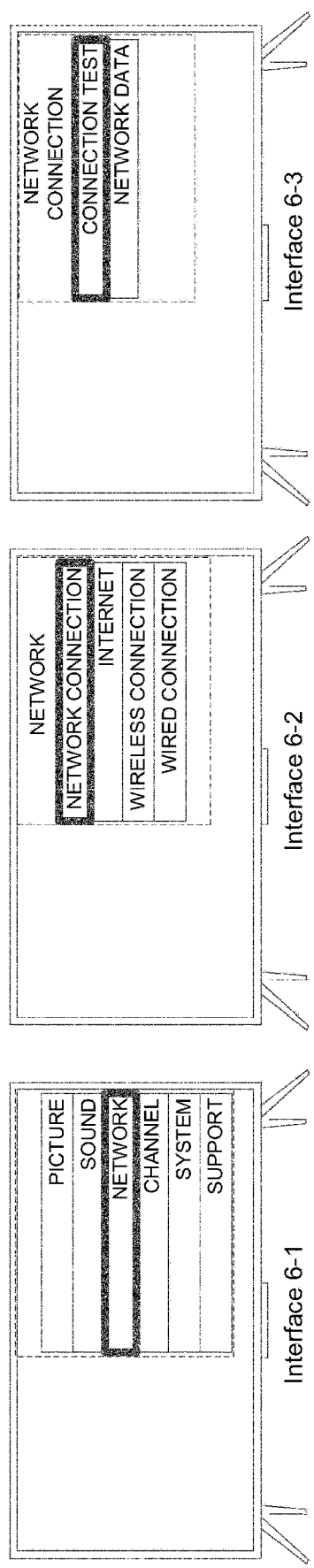
FIG. 11 is a schematic diagram illustrating a presentation interface of a display when a current language is a second language according to some embodiments.

FIG. 11 is a schematic diagram illustrating a presentation interface of a display when a current language is a second language according to some embodiments, where an interface 6-1 is a presentation interface of the menu for SYSTEM; an interface 6-2 is a presentation interface of the menu for NETWORK, and an interface 6-3 is a presentation interface of the menu of NETWORK CONNECTION.

Figure 12:
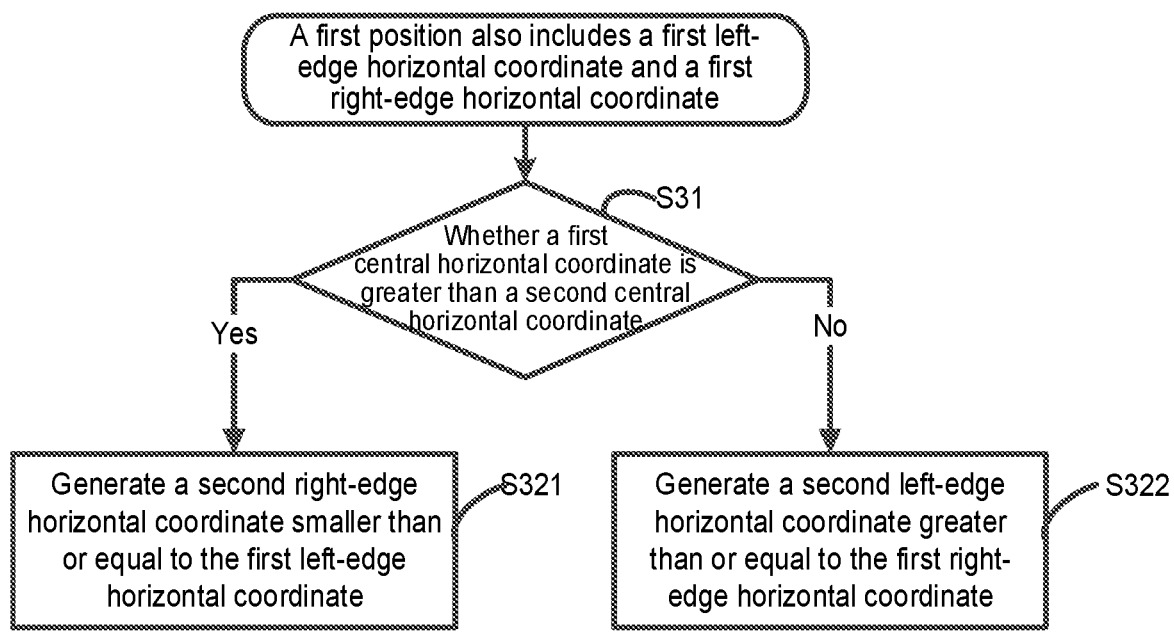
FIG. 12 is a flowchart illustrating a way of generating a second position according to some embodiments.

Regarding the display apparatus in the embodiments, the first position may be located on a left side or a right side of the display. To prevent the prompt information from blocking the control, in some embodiments, the controller needs to determine in advance whether the first position is located on the left side or the right side of the display. For a specific implementation process, reference may be made to FIG. 12. FIG. 12 is a flowchart illustrating a way of generating a second position according to some embodiments, where the controller is configured to perform steps S31 to S321/S322.

Step S31. Determine whether a first central horizontal coordinate is greater than a second central horizontal coordinate.

The first position in the present disclosure also may include a first left-edge horizontal coordinate, a first right-edge horizontal coordinate, and a first central horizontal coordinate, where the first left-edge horizontal coordinate indicates a horizontal coordinate of a left edge of the first position, the first right-edge horizontal coordinate indicates a horizontal coordinate of a right edge of the first position, and the first central horizontal coordinate indicates a horizontal coordinate of the center of the first position; and the second central horizontal coordinate indicates a horizontal coordinate of a center of a presentation interface of the display.

If the first central horizontal coordinate is greater than the second central horizontal coordinate, proceed to step S321 to generate a second right-edge horizontal coordinate smaller than or equal to the first left-edge horizontal coordinate, where the second right-edge horizontal coordinate indicates a horizontal coordinate of a right edge of the second position.

If the first central horizontal coordinate is smaller than the second central horizontal coordinate, proceed to step S322 to generate a second left-edge horizontal coordinate greater than or equal to the first right-edge horizontal coordinate, where the second left-edge horizontal coordinate indicates a horizontal coordinate of a left edge of the second position.

Figure 13A:
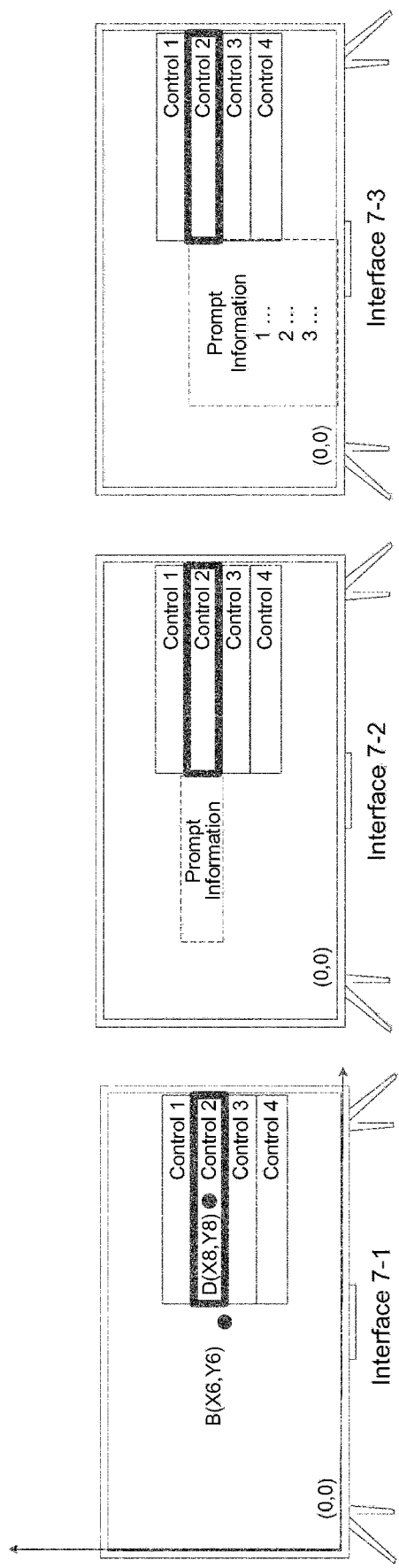
FIG. 13A is a schematic diagram illustrating a change of a presentation interface of a display according to some embodiments.

For example, FIG. 13A is a schematic diagram illustrating a change of a presentation interface of a display according to some embodiments. In an interface 7-1 in FIG. 13A, a control 2 is the first control, and the focus frame falls on the control 2. The coordinate system involved in the embodiments takes the lower right corner of the display as an origin, takes a line along the lower edge of the display as an X axis, and takes a line along the left edge of the display as a Y axis. A coordinate of the center of the first position is D (X8, Y8), and a coordinate of the center of the presentation interface of the display is B (X6, Y6). In the present disclosure the controller compares X6 with X8, and compares Y6 with Y8. If Y8>Y6, the top vertical coordinate of the second position is generated to be equal to the top vertical coordinate of the first position; and if X8>X6, the second right-edge horizontal coordinate is generated to be smaller than or equal to the first left-edge horizontal coordinate. For specific visual effects, reference may be made to an interface 7-2 in FIG. 13A. It may be seen from the interface 7-2 that the presentation position of the focus frame and the presentation position of the prompt information have the top edges at the same level, and the presentation position of the prompt information is at a left side of the presentation position of the focus frame. In some embodiments, if the prompt information includes more content, the prompt information may be presented in an area from the top edge of the presentation position downwards until the edge of the display. For details, reference may be made to an interface 7-3 in FIG. 13A.

Figure 13B:
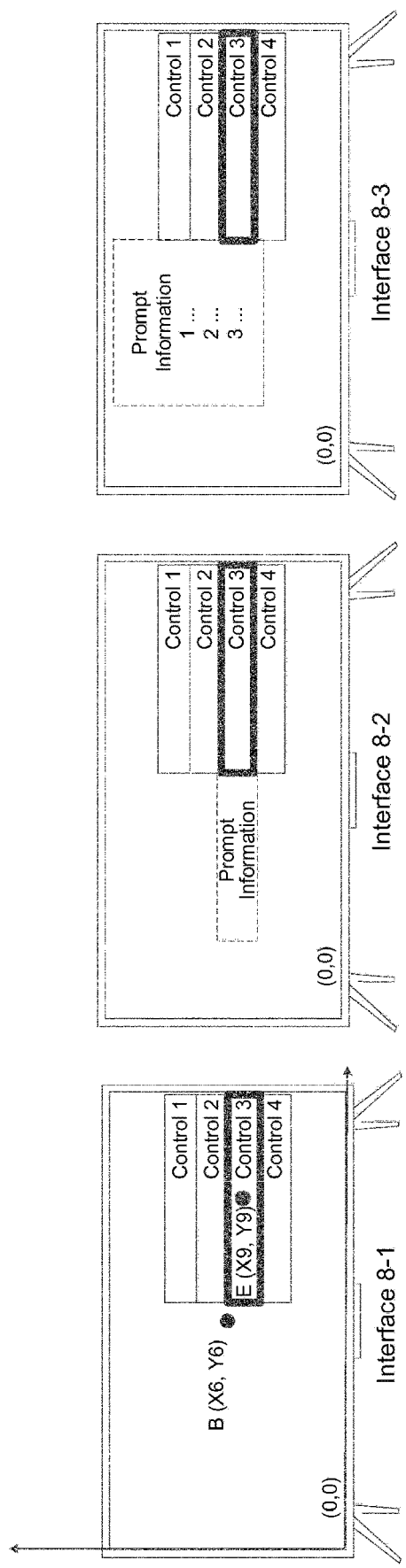
FIG. 13B is a schematic diagram illustrating a change of a presentation interface of a display according to some embodiments.

For example, FIG. 13B is a schematic diagram illustrating a change of a presentation interface of a display according to some embodiments. In an interface 8-1 in FIG. 13B, a control 3 is the first control, and the focus frame falls on the control 3. A coordinate of the center of the first position is E (X9, Y9), and a coordinate of the center of the display is B (X6, Y6). In the present disclosure the controller compares X6 with X9, and compares Y6 with Y9. If Y9<Y6, the bottom vertical coordinate of the second position is generated to be equal to that of the first position; and if X9>X6, the second right-edge horizontal coordinate is generated to be smaller than or equal to the first left-edge horizontal coordinate. For specific visual effects, reference may be made to an interface 8-2 in FIG. 13B. It may be seen from FIG. 13B that the presentation position of the focus frame and the presentation position of the prompt information have the bottom edges at the same level, and the presentation position of the prompt information is on the left side of the presentation position of the focus frame. In some embodiments, if the prompt information includes more content, the prompt information may be presented in an area from the bottom edge of the presentation position upwards until the edge of the display. For details, reference may be made to an interface 8-3 in FIG. 13B.

Figure 14:
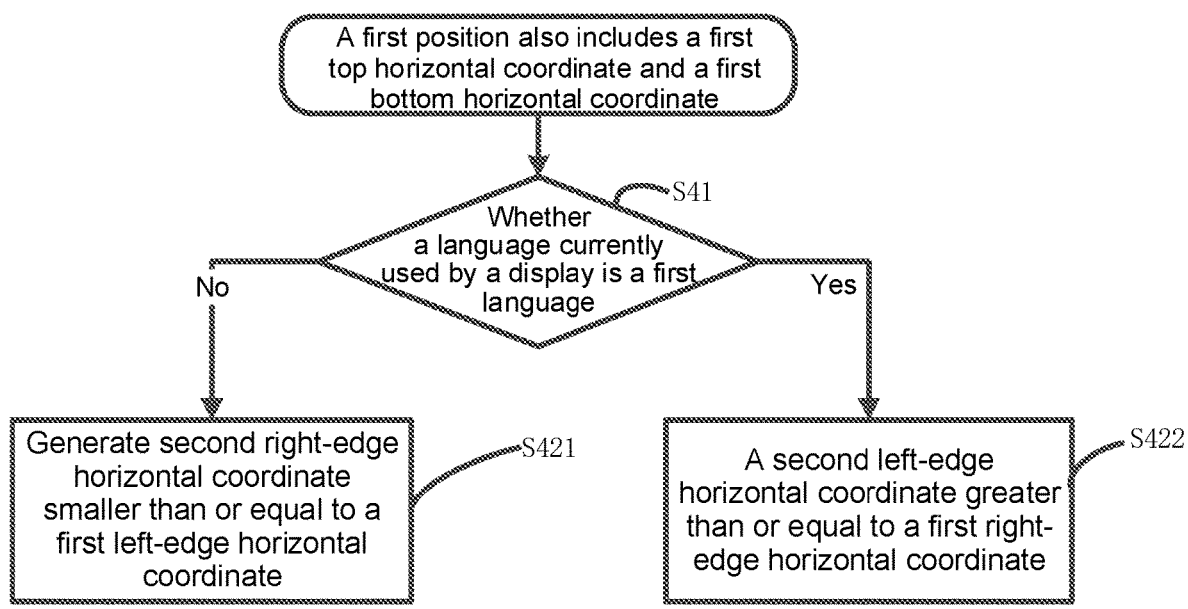
FIG. 14 is a flowchart illustrating a way of generating a second position according to some embodiments.

Some embodiments of the present disclosure further provide a method for generating a second position, and for details, reference may be made to FIG. 14. FIG. 14 is a flowchart illustrating a way of generating a second position according to some embodiments, where the controller is configured to perform steps S41 to S421/S422.

Step S41. Determien whether a language currently used by the display is a first language.

In the embodiments of the present disclosure, whenever adjustment of the language is completed, the controller stores information of the language currently used by the display apparatus. Specifically, the information of the language may be stored in a form of an identifier bit. For example, a first identifier bit corresponds to the first language, and a second identifier bit corresponds to the second language. When whether the control is located on the left side or the right side of the display needs to be determined, the controller may first determine whether the current language in use is the first language by reading the identifier bit. When the current language of the display apparatus is the first language, the control is displayed on the left side of the presentation interface; and when the current language of the display apparatus is the second language, the control is displayed on the right side of the presentation interface.

A first top horizontal coordinate indicates a horizontal coordinate of a top edge of the first control, and a first bottom horizontal coordinate indicates a horizontal coordinate of a bottom edge of the first control.

If the current language is set as the first language, proceed to step S422 to generate the second left-edge horizontal coordinate greater than or equal to the first right-edge horizontal coordinate, where the second left-edge horizontal coordinate indicates a horizontal coordinate of the left edge of the second position.

If the current language is set as the second language, proceed to step S421 to generate the second right-edge horizontal coordinate smaller than or equal to the first left-edge horizontal coordinate, where the second right-edge horizontal coordinate indicates a horizontal coordinate of the right edge of the second position.

In some embodiments of the present disclosure, the level-one control is not configured with prompt information, and a level-two or more inferior control may be configured with prompt information. When the first control is a level-two control, the user does not need to skip from the level-two control to the level-one control, because none of level-one controls is configured with prompt information. When the first control is a level-three or more inferior control, the user may skip to a control superior or inferior to the first control. To enable the user to more intuitively determine whether the first control is a level-two control from which a skip can be performed merely to an inferior control, or is a level-three or more inferior control from which a skip may be performed to a superior control and an inferior control, in the embodiment of the present disclosure, a presentation position of the prompt information corresponding to the level-two control may be set to be different from a presentation position of the prompt information corresponding to the level-three or more inferior control. Specifically, if the first level is the level two, the second right-edge horizontal coordinate is equal to the first left-edge horizontal coordinate, or the second left-edge horizontal coordinate is equal to the first right-edge horizontal coordinate; if the first level is inferior to level two, the second right-edge horizontal coordinate is smaller than the first left-edge horizontal coordinate, or the second left-edge horizontal coordinate is greater than the first right-edge horizontal coordinate; and vice versa.

Figure 15:
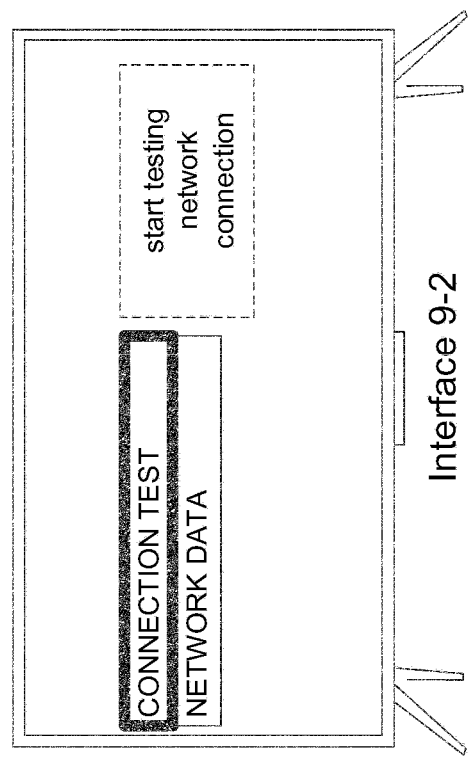
FIG. 15 is a schematic diagram illustrating a presentation interface of a display according to some embodiments.
Figure 15:
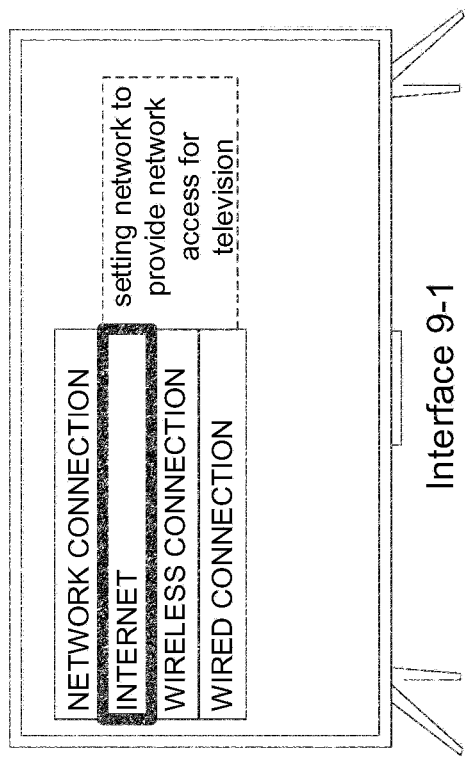

For example, FIG. 15 is a schematic diagram illustrating a presentation interface of a display according to some embodiments, where an interface 9-1 is a presentation interface of the display in a scenario where the first level is level two. It may be seen from the interface 9-1 that the prompt information is presented adjacent to the first control. An interface 9-2 is a presentation interface of the display in a scenario where the first level is inferior or equal to level three. It may be seen from the interface 9-2 that the prompt information is presented at an interval from the first control.

The embodiments of the present disclosure merely illustrate manners for presenting the prompt information. In actual application, the presentation position of the prompt information in a scenario where the first level is second two and the presentation position of the prompt information in a scenario where the first level is inferior or equal to level three may include, but not limited to the foregoing manners.

The controller is configured to perform step S105A to control the display to present the prompt information of the first control at the second position, where the first control is a control where the focus frame is about to move towards.

Figure 16:
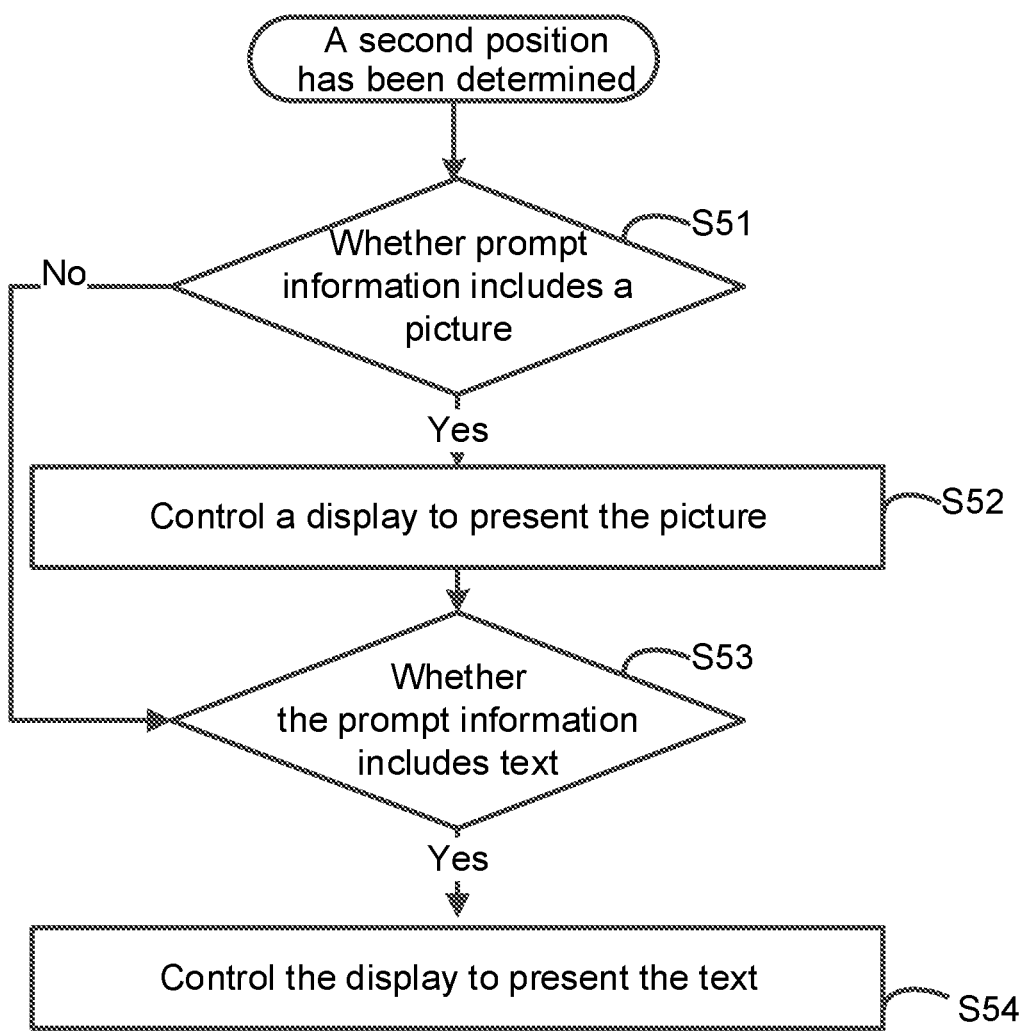
FIG. 16 is a flowchart illustrating a method for presenting prompt information according to some embodiments.

To present the prompt information more visually, some embodiments of the present disclosure show a method for presenting prompt information. For details, reference may be made to FIG. 16. FIG. 16 is a flowchart illustrating a method for presenting prompt information according to some embodiments, where the controller is configured to perform steps S51 to S54.

Step S51. Determine whether the prompt information includes a picture.

If the prompt information includes a picture, proceed to step S52 to control the display to present the picture.

In the embodiments of the present disclosure, the controller controls the display to present picture-type prompt information first than other type of prompt information. The picture may prompt for the user more visually.

If the prompt information has no picture, proceed to step S53 to determine whether the prompt information includes text.

If the prompt information includes no picture/presentation of the picture-type prompt information is performed, proceed to step S53 to determine whether the prompt information includes text.

If the prompt information includes text, proceed to step S54 to control the display to present the text.

Optionally, the picture is always located above the text during presentation.

In the embodiments of the present disclosure, the picture-type prompt information is always presented above text-type prompt information. The picture may prompt for the user more visually, thereby improving the user experience.

Figure 17:
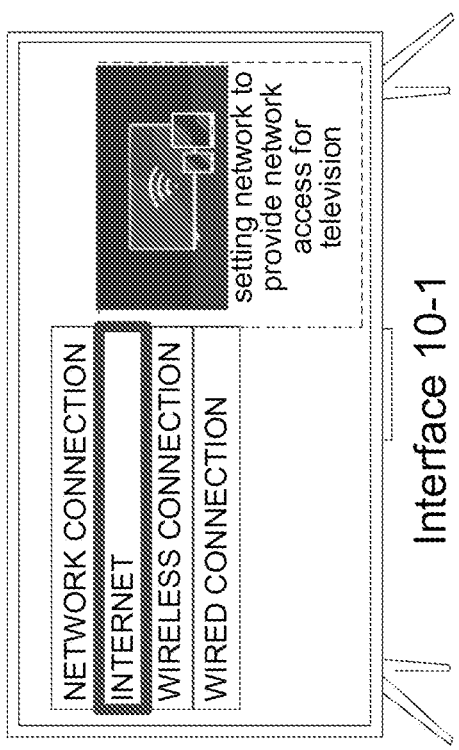
FIG. 17 is a schematic diagram illustrating a presentation interface of a display according to some embodiments.
Figure 17:
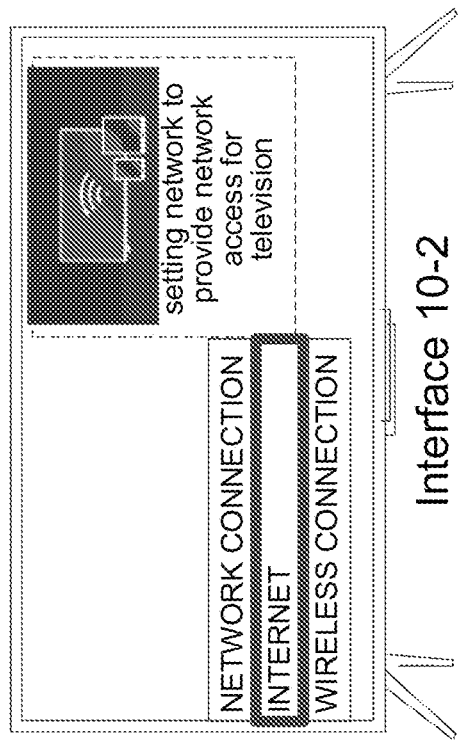

For example, FIG. 17 is a schematic diagram illustrating a presentation interface of a display according to some embodiments. An interface 10-1 is a presentation interface of the display in a scenario where the prompt information includes both text-type prompt information and picture-type prompt information. It may be seen from the interface 10-1 that the picture-type prompt information is located above the text-type prompt information. An interface 10-2 is a presentation interface of the display in a scenario where the prompt information includes both text-type prompt information and picture-type prompt information. It may be seen from the interface 10-2 that the picture-type prompt information is located above the text-type prompt information.

The display apparatus in the embodiments of the present disclosure includes the display and the controller, where the controller is configured to: read a first position in response to a command for moving a focus frame, where the first position indicates a position of a control where the focus frame is about to move towards; generate a second position based on the information of the first position, where the first position and the second position are related; and control the display to present prompt information of the first control at the second position, where the first control is the control where the focus frame is about to move towards. In view of the above, regarding the display apparatus in the embodiments of the present disclosure, the controller may generate the second position based on the first position, and control the display to present the prompt information at the second position. The user may learn more details about functions of the control through the prompt information, and further the prompt information is always presented around a corresponding control, improving user experience.

Figure 4B:
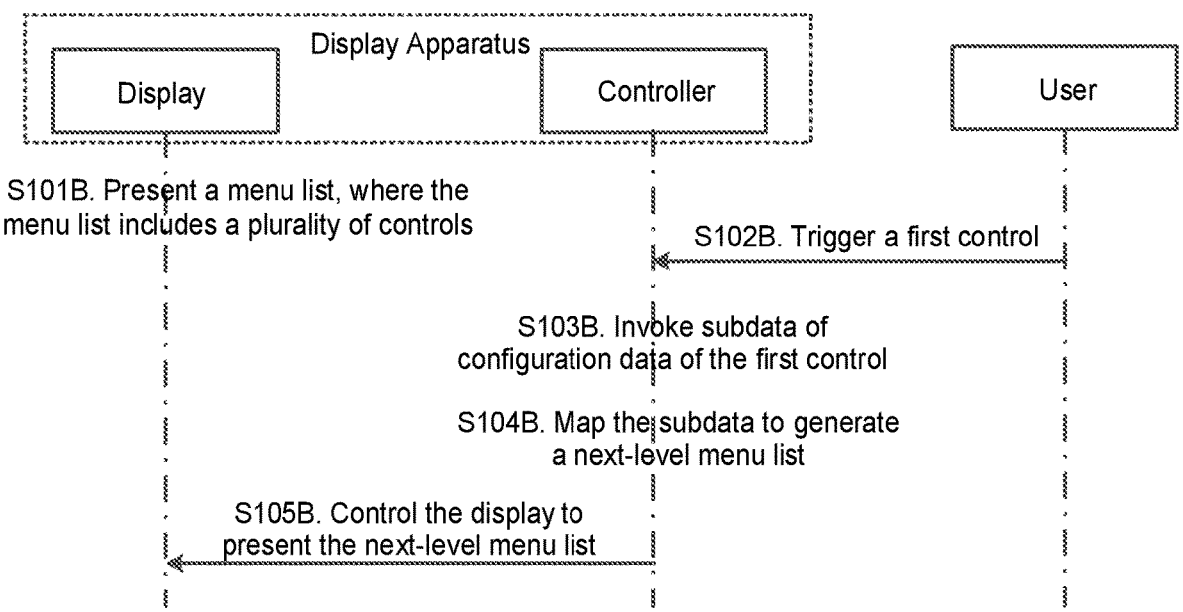
FIG. 4B is a flowchart illustrating an interaction between a display apparatus and a user according to some embodiments.

Some embodiments of the present disclosure provide a display apparatus. The display apparatus includes at least a display and a controller. For a flowchart illustrating an interaction between the display apparatus and a user, reference may be made to FIG. 4B. The display is configured to perform step S101B to present a menu list. The menu list is provided with a plurality of controls with a same level. The controls are provided with configuration data, and the configuration data is stored as data in a tree-like structure according to a parent-child relationship among the corresponding controls.

FIG. 5 is a schematic diagram illustrating a presentation interface of a display when the display presents a menu list according to some embodiments. A menu list may be presented in a form of a floating window, and includes at least a control.

Generally, there is a "parent-child" relationship among various controls. In actual application, the controls may be classified into a level-one control, a level-two control, a level-three control, . . . according to the parent-child relationship among the controls. The level-one control, without a parent control (superior control), is a control configured in a setting menu. Typically, the level-one control may be directly invoked by the user. The level-two control is a sub-control (an inferior control) of the level-one control, and a corresponding level-two control may be invoked through the level-one control by the user. Specifically, when the user clicks on a level-one control, the display may present a menu list corresponding to the level-one control, which includes a sub-control of the level-one control. For example, when the user clicks on a control for NETWORK (level-one control), the controller controls the display to present a menu list of the control for NETWORK, where reference may be made to an interface 1-2 in FIG. 5 for details. The menu list of the control for NETWORK includes a control for NETWORK CONNECTION, a control for INTERNET, a control for WIRE CONNECTION, and a control for WIRELESS CONNECTION. The level-three control is a sub-control (an inferior control) of the level-two control. The user needs to invoke the corresponding level-two control through the level-one control, and then invoke the corresponding level-three control through the level-two control. For example, when the user clicks on the control for NETWORK (level-one control), the controller controls the display to present the menu list of the control for NETWORK, where reference may be made to the interface 1-2 in FIG. 5 for details. When the user clicks on the control for NETWORK CONNECTION (level-two control), the controller controls the display to present a menu list of the control for NETWORK CONNECTION, where reference may be made to an interface 1-3 in FIG. 5 for details. A list of network-connection functions includes a control for CONNECTION TEST and a control for NETWORK DATA.

Step S102B is performed to trigger a first control by the user.

The implementation manner for the user to trigger the first control is not limited in the embodiments. For example, in some embodiments, the first control may be triggered through a remote control by the user. For another example, in some embodiments, the controller may be installed with voice assistant software, and correspondingly, the user may trigger the first control through voice. In actual application, implementation manners for triggering the first control may include, but not limited to the foregoing two manners.

In response to triggering of the first control from the user, the controller performs step S103B to invoke subdata of configuration data of the first control, where the first control is a control selected by the user.

Figure 18:
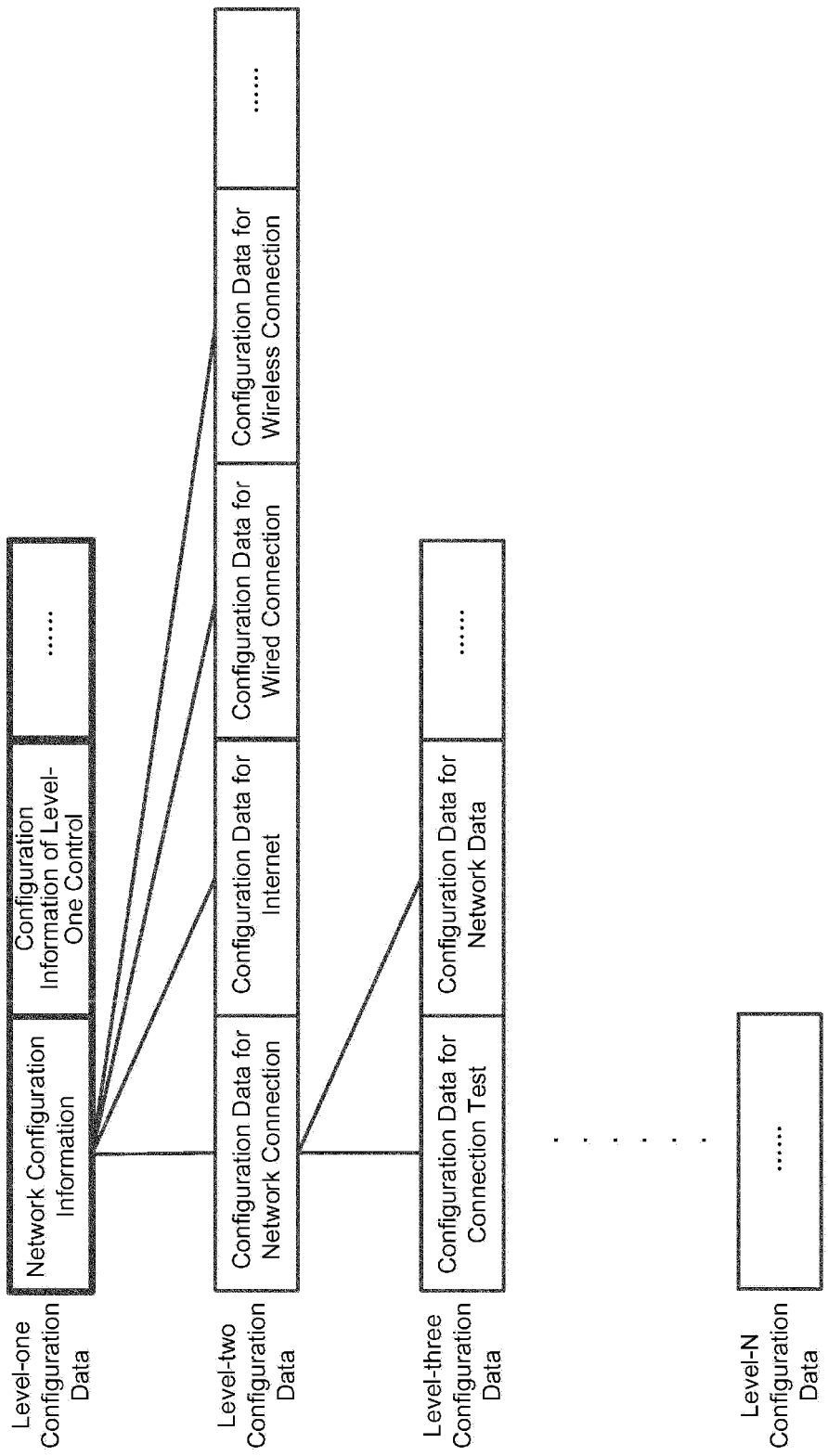
FIG. 18 is a schematic diagram illustrating data in a tree-like structure according to some embodiments.

In the embodiments of the present disclosure, the configuration data is pre-stored as data in a tree-like structure according to a parent-child relationship among the corresponding controls. FIG. 18 is a schematic diagram illustrating data in a tree-like structure according to some embodiments. It may be seen from FIG. 18 that subdata of configuration data for network includes: configuration data for network connection, configuration data for Internet, configuration data for wired connection, and configuration data for wireless connection. Subdata of the configuration data for network connection includes configuration data for connection test and configuration data for network data.

Therefore, when the user triggers the first control, the corresponding configuration data of the first control is selected, and subdata of the selected configuration data may be found in the data in a tree-like structure.

For example, in some embodiments, for the menu list presented on the display, reference may be made to an interface 1-1 in FIG. 5. The user triggers the control for NETWORK as required. In response to triggering the control for NETWORK from the user, the controller invokes the subdata of the configuration data for network (the configuration data for network connection, the configuration data for Internet, the configuration data for wired connection, and the configuration data for wireless connection). The controller maps a next-level menu list (a menu list for NETWORK) based on the configuration data for network connection, the configuration data for Internet, the configuration data for wired connection, and the configuration data for wireless connection. For details, reference may be made to the interface 1-2 in FIG. 5.

Optionally, the controller is further configured to: write the subdata of the configuration data of the first control into a presentation list in response to triggering of the first control from the user; and invoke the subdata from the presentation list.

S104B. Map the subdata to generate a next-level menu list.

The next-level menu list may be mapped by using a common manner of mapping a next-level menu list in the field, which are not described in detail herein.

S105B. Control the display to present the next-level menu list.

To improve user experience, controls in the embodiments of the present disclosure include an operation control, a gray control, and a non-display control, where the operation control is a control presented in the menu list which can be operated by the user; the non-display control is a control that does not need to be presented in the menu list, and the configuration data of the non-display control is provided with a first identifier; and the gray control is a control presented in the menu list which can not be operated by the user, and the configuration data of the gray control is provided with a gray identifier.

When the user triggers different levels of controls, processing processes of the controller are different. For example, when the user triggers the level-one control, the level-one control is not involved in subsequent processing such as initialization settings. Therefore, when the user triggers a level-one control, the controller may directly map a next-level menu list by using the subdata of the configuration data of the first control. When the user triggers a level-two control or a control inferior to the level-two control, the level-two control or the control inferior to the level-two control may be involved in subsequent processing such as initialization settings. Therefore, when the user triggers the level-two control or the control inferior to the level-two control, the controller needs to determine time for mapping the next-level menu list based on subdata of the configuration data of the level-two control or the control inferior to the level-two control.

Figure 19:
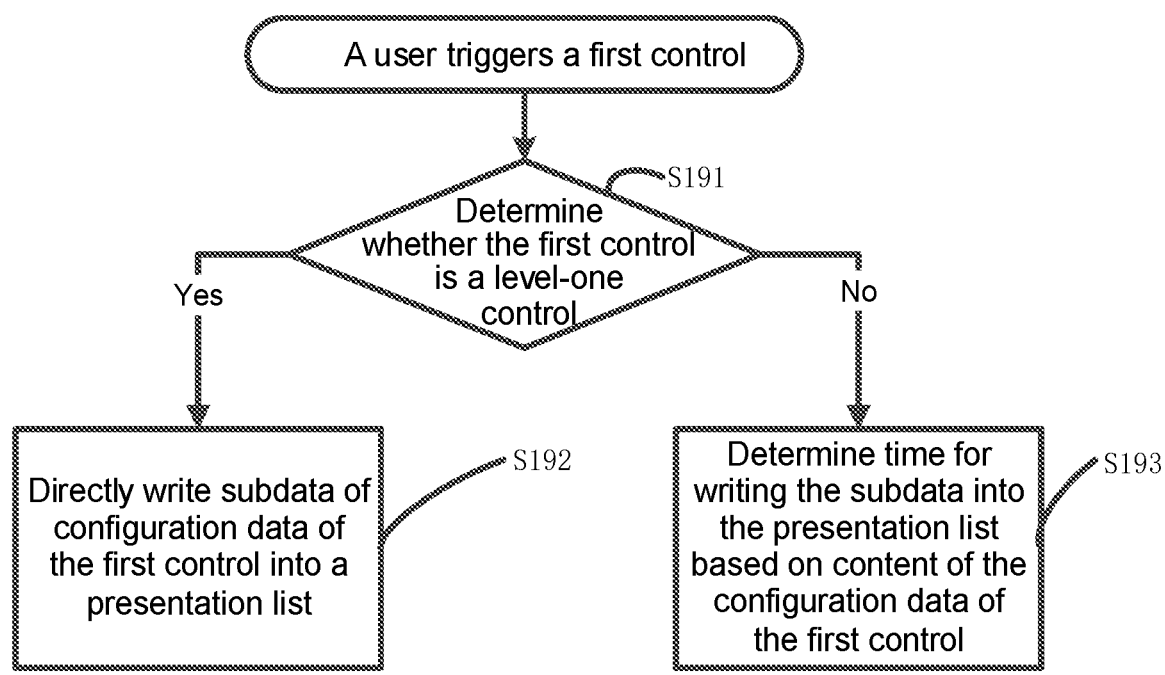
FIG. 19 is a flowchart illustrating an implementation process of writting subdata into a presentation list according to some embodiments.

For a specific operation flow of the controller, reference may be made to FIG. 19. FIG. 19 is a flowchart illustrating an implementation process of writing subdata into a presentation list according to some embodiments. The controller is configured to perform the following steps.

S191. Determine whether the first control is a level-one control.

There are a lot of implementation manners for determining whether the first control is a level-one control. For example, in some embodiments, all controls are configured with configuration information, where the configuration information may include, but not limited to an attribute of the control, a control ID of the control, and prompt information of the control. A level of the control may be determined based on the control ID. IDs of different levels of controls may be set to have different lengths, and then it may be determined, based on a number of characters included in the control ID, what level the control is. For example, in some embodiments, the control ID of the level-one control includes A characters, the control ID of the level-two control includes B characters, and the control ID of the level-three control includes C characters . . . . The controller may determine the first level based on the number of the characters included in the control ID. For another example, in some embodiments, different identifiers may be set for IDs of different levels of controls, and then whether the control is a level-one control may be determined based on the identifier included in the control ID. For example, in some embodiments, the control ID of the level-one control includes an identifier A, the control ID of the level-two control includes an identifier B, and the control ID of the level-three control includes an identifier C . . . . The controller may determine whether the control is a level-one control based on the identifier included in the control ID.

In actual application, implementation manners for determining whether the first control is a level-one control may include, but not limited to the foregoing two manners.

If the first control is a level-one control, proceed to step S192 to directly write the subdata of the configuration data of the first control into the presentation list.

If the first control is not a level-one control, proceed to step S193 to determine time for writing the subdata into the presentation list based on content of the configuration data of the first control.

Figure 20:
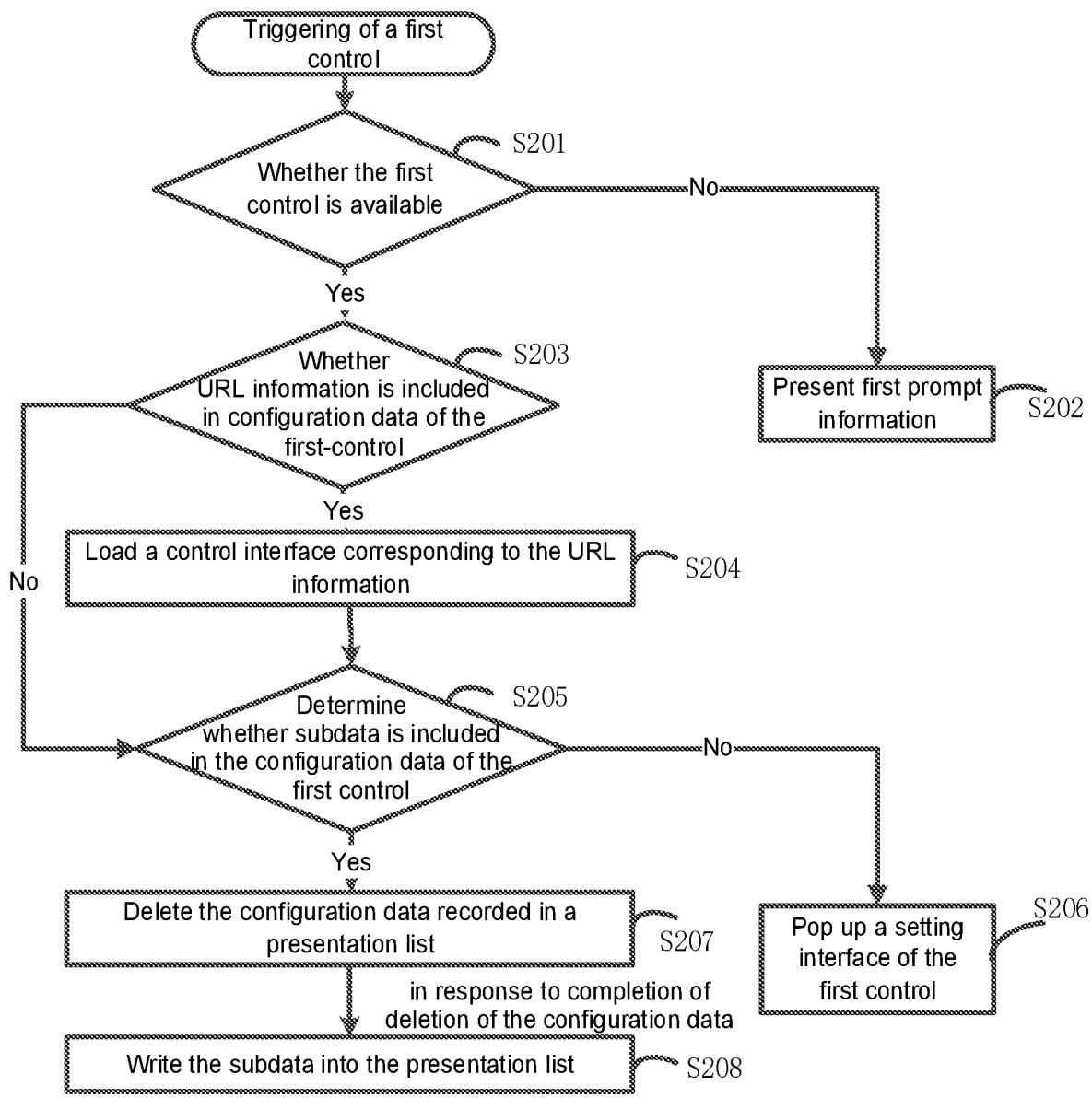
FIG. 20 is a flowchart of writting subdata into a presentation list when a first control is not a level-one control.

For an implementation process of determining the time for writing the subdata into the presentation list based on the content of the configuration data of the first control, reference may be made to FIG. 20. FIG. 20 is a flowchart of writing subdata into a presentation list when a first control is not a level-one control. The controller is configured to perform steps S201 to S206.

S201. Determine whether the first control is available (that is, determine whether the first control triggered by the user is a gray control).

The implementation manner for determining whether the first control is available may comprise: pre-adding different identifiers for the configuration data corresponding to different controls. For example, a gray identifier may be added for the configuration data of the gray control. The controller may determine whether the first control is available based on whether the configuration data of the first control includes the gray identifier.

If the first control is not available, the controller performs step S202 to control the display to present first prompt information, where the first prompt information is used for prompting the first control being not available for operation and a function of the first control.

In the embodiments of the present disclosure, an objective of setting the gray control is to prompt the user. The display apparatus is provided with a function item corresponding to the gray control, but this function item is automatically invoked by the controller, and the user does not have the authority to invoke this function. When the user triggers the gray control, the controller controls the display to present the first prompt information, where the first prompt information is used for prompting the first control being not available for operation and the function of the first control.

Figure 21:
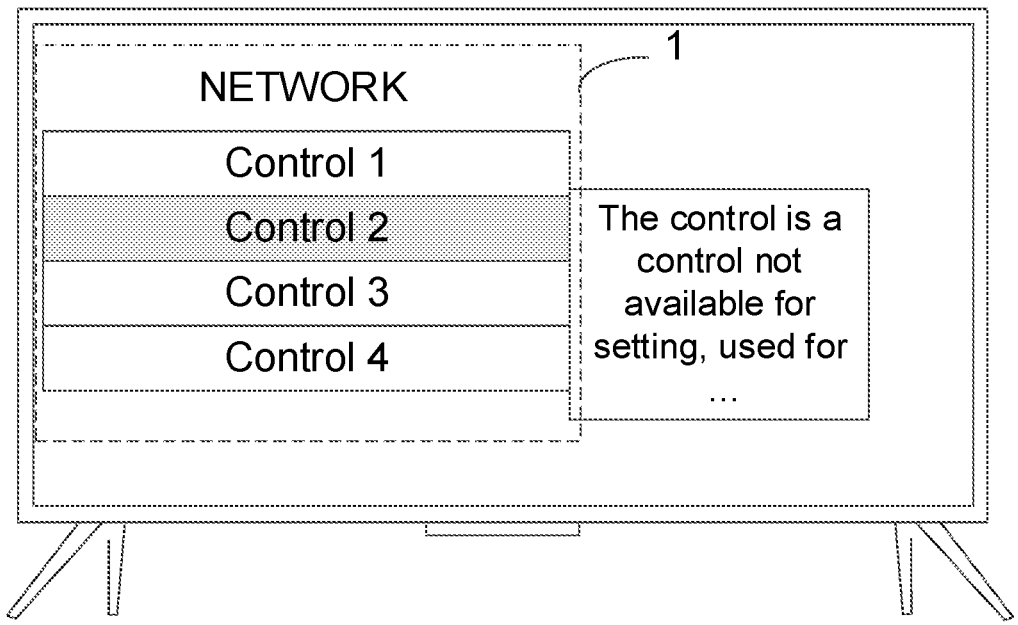
FIG. 21 is a schematic diagram illustrating a presentation interface of a display apparatus when a user triggers a gray control according to some embodiments.

FIG. 21 is a schematic diagram illustrating a presentation interface of a display apparatus when a user triggers a gray control according to some embodiments. The first prompt information may be presented in a form of a floating window, and a presentation position of the first prompt information is not limited in the embodiments. In actual application, the presentation position of the first prompt information may be configured as required. For example, in some embodiments, the presentation position of the first prompt information may be located at an upper right corner of the display.

In some embodiments, the controller counts presentation duration of the first prompt information from a time of controlling the display to present the first prompt information, and controls the display to cancel the first prompt information if the presentation duration is equal to a preset duration. The preset duration is not limited in the embodiments. In some embodiments, the preset duration may be set as required. For example, the preset duration may be 3 s.

If the first control is available, the controller performs step S203 to determine whether URL (uniform resource locator) information is included in the configuration data of the first control.

The implementation manner for determining whether the URL information included in the configuration data of the first control may be a known means in the field, which are not described in detail herein.

If the configuration data of the first control includes the URL information, proceed to step S204 to load a control interface corresponding to the URL information.

A specific implementation process may be: the controller is configured to, if the configuration data of the first control includes the URL information, request a server for data associated with the URL information, so that the server issues data corresponding to the URL information. After receiving the data issued from the server, the controller controls loading of the control interface.

The control interface is an interface associated with the control. For example, in some embodiments, the control interface may be an interface for inputting a password that is related to the control. Presentation content of the control interface is not limited in the embodiments of the present disclosure, and in actual application, the control interface may be configured as required.

If the configuration data of the first control does not include the URL information, proceed to step S205 to determine whether subdata is included in the configuration data of the first control.

There are a lot of implementation manners for determining whether the subdata is included in the configuration data of the first control. For example, in some embodiments, different node identifiers may be set for configuration data of a root node and configuration data of a non-root node, and then the controller may determine whether the subdata is included in the configuration data based on the node identifier in the configuration data. For example, in some embodiments, a root-node identifier may be pre-added for the configuration data of the root node, and when it is determined that the configuration data does not include the URL information, the controller may determine whether the subdata is included in the configuration data through reading the root-node identifier, in some embodiments, if subdata is further added to the root node in a subsequent research and development process, the root-node identifier written into the root node may be deleted.

If there is no subdata, proceed to step S206 to pop up a setting interface of the first control.

Figure 22:
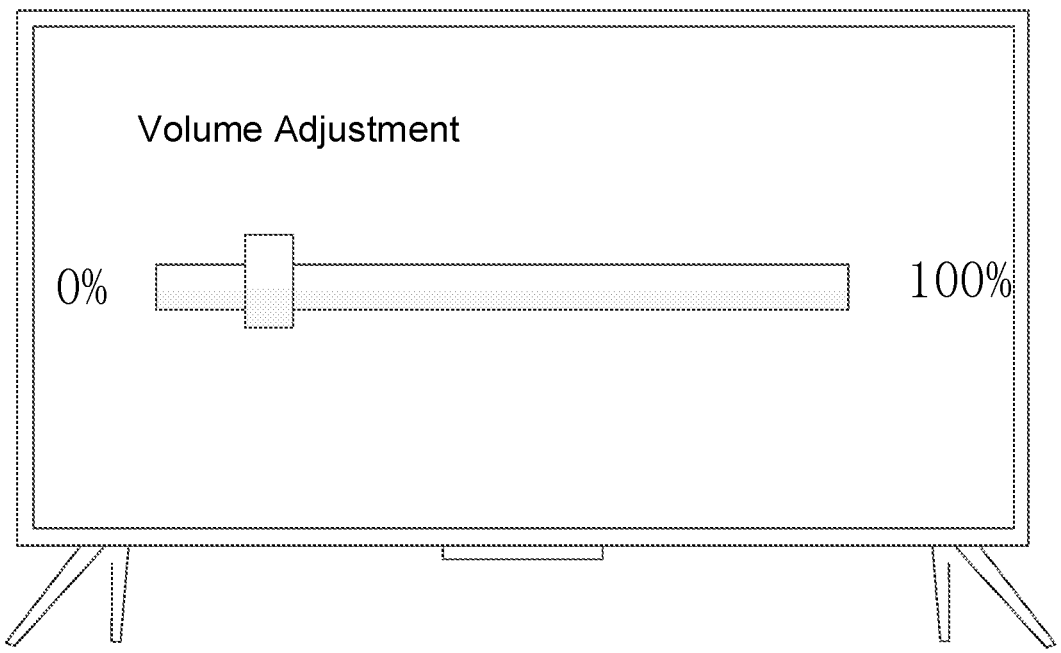
FIG. 22 is a schematic diagram illustrating a setting page of a control for adjusting volume according to some embodiments.

FIG. 22 is a schematic diagram illustrating a setting page of a control for adjusting volume according to some embodiments. The user may adjust volume of the display apparatus by moving a volume bar.

If there is the subdata, proceed to step S207 to delete the configuration data recorded in the presentation list.

In response to completion of deletion of the configuration data, proceed to step S208 to write the subdata into the presentation list.

Whenever it is determined that the configuration data includes subdata, the controller needs to write the subdata into the presentation list. To reduce space of a memory occupied by resources, in the embodiments, whenever it is determined that the configuration data includes subdata, the controller firstly deletes the configuration data of the first control recorded in the presentation list; and write the subdata into the presentation list in response to completion of deletion of the configuration data of the first control.

Figure 23:
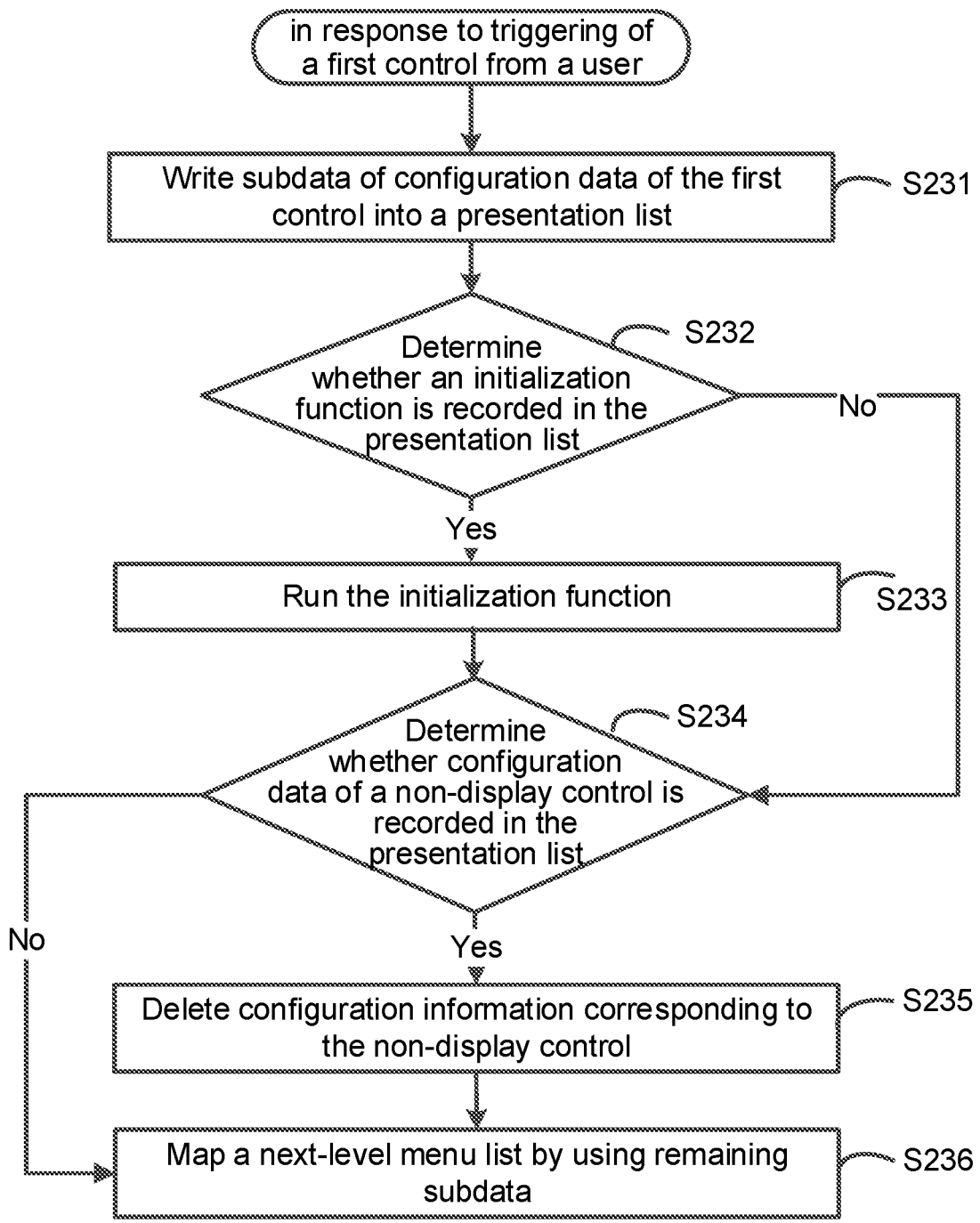
FIG. 23 is a flowchart illustrating a method for mapping a next-level menu list when a first control is a level-one control according to some embodiments.

When the first control is a level-one control, for a flow-chart illustrating a method for mapping a next-level menu list, reference may be made to FIG. 23, where the controller is configured to perform steps S231 to S236.

If the first control is a level-one control, in response to triggering of the first control from the user, the controller performs step S231 to directly write the subdata of the configuration data corresponding to the first control into the presentation list.

For the implementation manner of writing the subdata into the presentation list, reference may be made to the foregoing embodiments, and details are not described herein again.

In response to completion of writing of the subdata, the controller is configured to perform step S232 to determine whether the presentation list includes an initialization function.

There are a lot of implementation manners for determining whether the presentation list includes an initialization function. For example, in some embodiments, the initialization function may be stored at a specific position of the presentation list. The controller directly reads data from the specific position of the presentation list. Based on whether the data is obtained from the specific position, the controller determines whether the presentation list includes the initialization function. For example, in some embodiments, the specific position may be a storage area for $N^{th}$ to $M^{th}$ characters in the presentation list. The controller directly reads the initialization function from the storage area for the $N^{th}$ to $M^{th}$ characters in the presentation list. If the data is obtained, it means that the initialization function is recorded in the presentation list; and if the data is not obtained, it means that the initialization function is not recorded in the presentation list. For another example, in some embodiments, the initialization function may be configured with an initialization-function identifier, and the controller may determine whether the presentation list includes the initialization function based on whether the initialization-function identifier is obtained. For example, in some embodiments, the initialization function has an identifier A, and the controller searches the presentation list for the identifier A. If the identifier A is found, it means that the initialization fuinction is recorded in the presentation list, and if the identifier A is not found, it means that the initialization-function is not recorded in the presentation list.

In actual application, implementation manners for determining whether the presentation list includes the initialization function may include, but not limited to the foregoing two manners.

If the initialization function is recorded in the presentation list, proceed to step S233 to run the initialization function.

In response to completion of running of the initialization function/if the initialization function is not recorded in the presentation list, the controller performs step S234 to determine whether the configuration data of the non-display control is recorded in the presentation list.

To determine whether the configuration data of the non-display control is recorded in the presentation list, different identifiers may be pre-added for the configuration data corresponding to different controls. For example, a first identifier may be added for the configuration data of the non-display control, and the controller may determine, based on weather the first identifier is recorded in the presentation list, whether the configuration data of the non-display control is recorded in the presentation list.

If the configuration data of the non-display control exists, proceed to step S235 to delete configuration data corresponding to the first identifier.

Step S236. Map a next-level menu list by using remaining subdata.

The method for mapping the next-level menu list may be a common mapping method in the field, and details are not described herein.

Figure 24:
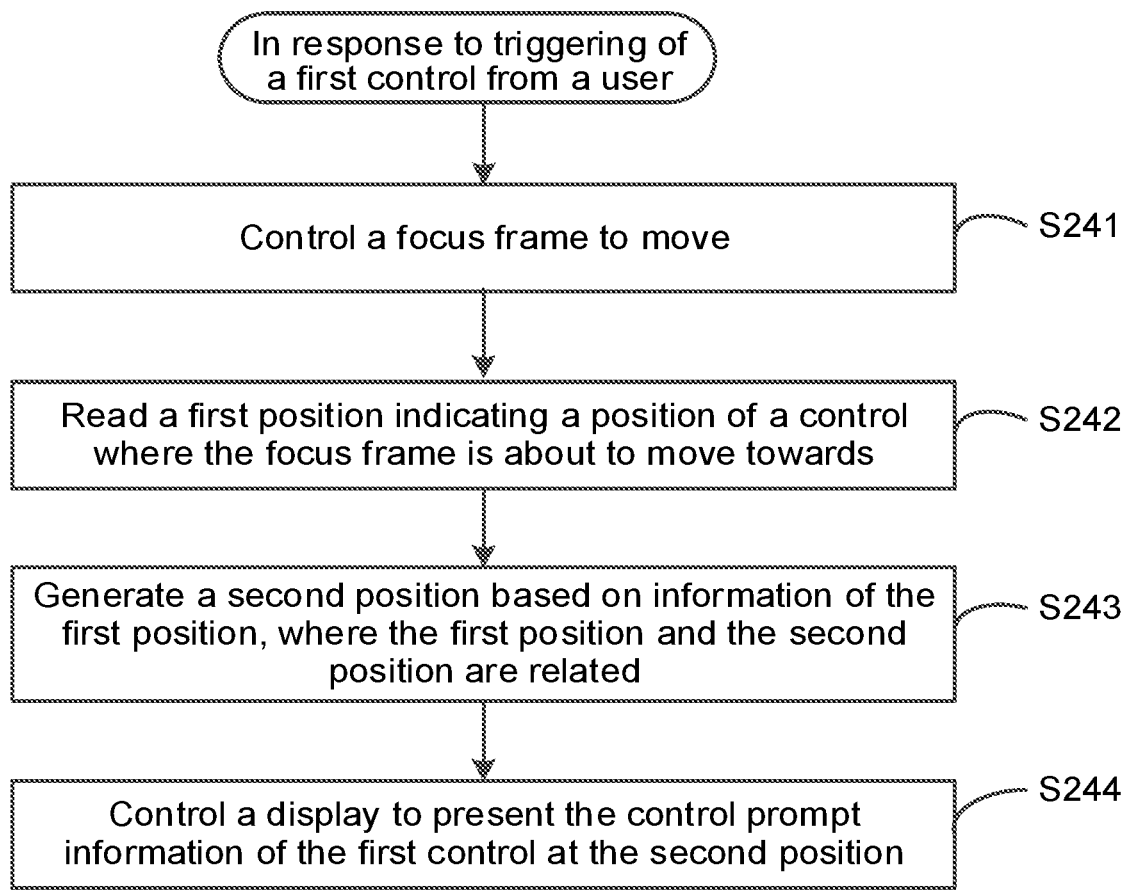
FIG. 24 is a flowchart illustrating a way of presenting control prompt information according to some embodiments.

Optionally, to improve user experience, in some embodiments, control prompt information may be configured for the control. For a specific manner of presenting the control prompt information, reference may be made to FIG. 24, where the controller is configured to perform steps S41 to S44.

In response to triggering of the first control from the user, proceed to step S241 to control a focus frame to move.

Step S242. Read a first position, where the first position indicates a position of a control where the focus frame is about to move towards.

Step S243. Generate a second position based on information of the first position, where the first position and the second position are related.

Step S244. Control the display to present the control prompt information of the first control at the second position, where the first control is the control where the focus frame is about to move towards.

In the embodiments of the present disclosure, the first position and the second position are related. The relation between the first position and the second position may indicate that a center of the first position and a center of the second position are at a same level. For details, reference may be made to FIG. 8 and the corresponding description thereof, which is not repeated here.

The display apparatus in the embodiments of the present disclosure includes the display and the controller. The controller is configured to: control the display to present a menu list, where the menu list is provided with a plurality of controls with a same level, the controls are provided with configuration data, and the configuration data is stored as data in a tree-like structure according to the parent-child relationship among the corresponding controls; invoke the subdata of the configuration data of a first control in response to triggering of the first control from a user, where the first control is a control selected by the user; map the subdata to generate a next-level menu list; and control the display to present the next-level menu list. In view of the above, the display apparatus in the embodiments of the present disclosure pre-stores the configuration data of the control as data in a tree-like structure according to the parent-child relationship among the controls. When the user triggers the first control, the controller invokes the subdata of the configuration data of the first control, and maps the next-level menu list based on the subdata. In the foregoing process, a data framework is not required. Therefore, the level of the control is not restricted by a level of the data framework, and the level of the control may be configured arbitrarily.

In specific implementations, the present disclosure further provides a computer readable non-volatile storage medium. The storage medium may store programs. The programs, while being executed, may cause a processor to perform some or all of steps in the embodiments of a method for customizing a control button and a method for starting the control button that are provided in the present disclosure. The storage medium may be a magnetic disk, a compact disc, a read-only memory (ROM), or a random access memory (RAM).

For ease of explanation, the foregoing descriptions are given in combination with specific implementations. However, the foregoing exemplary discussions are not intended to limit the implementations to the specific forms disclosed above. Various modifications and variations may be obtained in view of the foregoing teachings. Selections and description of the foregoing implementations are intended to better explain the principles and practical applications, so that a person skilled in the art can better use the implementations and implementations of various different variations suitable for specific use.

What is claimed is:

1. A display apparatus, comprising:
a display; and
a controller, configured to:
read a first position in response to a command for moving a focus frame, wherein the first position indicates a position of a control where the focus frame is about to move towards;
generate a second position based on information of the first position, wherein the first position and the second position are related; and
control the display to present prompt information of a first control at the second position, wherein the first control is the control where the focus frame is about to move towards;
wherein the first position comprises a first left-edge horizontal coordinate indicating a horizontal coordinate of a left edge of the first position and a first right-edge horizontal coordinate indicating a horizontal coordinate of a right edge of the first position; and if a current language of the display apparatus is a first language, the control is displayed on a left side of a presentation interface of the display, and if the current language of the display apparatus is a second language, the control is displayed on a right side of the presentation interface;
wherein the controller is further configured to:
in response to the current language being set as the first language, generate the second position having a second left-edge horizontal coordinate greater than or equal to the first right-edge horizontal coordinate, wherein the second left-edge horizontal coordinate indicates a horizontal coordinate of a left edge of the second position; and
in response to the current language being set as the second language, generate the second position having a second right-edge horizontal coordinate smaller than or equal to the first left-edge horizontal coordinate, wherein the second right-edge horizontal coordinate indicates a horizontal coordinate of a right edge of the second position.

2. The display apparatus according to claim 1, wherein the controller is further configured to:
read a first ID, where the first ID is for indicating a control ID of the first control;
determine a first level of the first control based on the first ID; and
not read the first position in response to the first level being a level one.

3. The display apparatus according to claim 2, wherein each control is configured with an information list where prompt information of the control is stored; and the controller is further configured to:
in response to the first level being not the level one, read the prompt information from a target information list, wherein the target information list is the information list of the first control; and
not read the first position in response to the prompt information being not obtained.

4. The display apparatus according to claim 3, wherein the controller is further configured to: in response to the prompt information being obtained,
if the first level is different from a second level of a second control, control the display to play a level-change animation-, wherein the focus frame is moved from the second control to the first control in response to the command for moving the focus frame; and read the first position in response to ending of playing of the level-change animation; and if the first level is the same as the second level, read the first position.

5. The display apparatus according to claim 4, wherein the first position further comprises a first top vertical coordinate indicating a vertical coordinate of a top edge of the first position, a first bottom vertical coordinate indicating a vertical coordinate of a bottom edge of the first position, and a first central vertical coordinate indicating a vertical coordinate of a center of the first position; the presentation interface of the display has a center with a second central vertical coordinate; wherein the controller is further configured to:

in response to the first central vertical coordinate being greater than or equal to the second central vertical coordinate, generate the second position having a second top vertical coordinate equal to the first top vertical coordinate, wherein the second top vertical coordinate indicates a vertical coordinate of a top edge of the second position; and in response to the first central vertical coordinate being smaller than the second central vertical coordinate, generate the second position having a second bottom vertical coordinate equal to the first bottom vertical coordinate, wherein the second bottom vertical coordinate indicates a vertical coordinate of a bottom edge of the second position.

6. The display apparatus according to claim 5, wherein the first position further comprises a first central horizontal coordinate indicating a horizontal coordinate of the center of the first position; and the center of the presentation interface of the display has a second central horizontal coordinate; wherein the controller is further configured to:

in response to the first central horizontal coordinate being greater than the second central horizontal coordinate, generate the second position having a second right edge horizontal coordinate smaller than or equal to the first left-edge horizontal coordinate, wherein the second right-edge horizontal coordinate indicates a horizontal coordinate of a right edge of the second position; and in response to the first central horizontal coordinate being smaller than the second central horizontal coordinate, generate the second position having a second left-edge horizontal coordinate greater than or equal to the first right-edge horizontal coordinate, wherein the second left-edge horizontal coordinate indicates a horizontal coordinate of a left edge of the second position.

7. The display apparatus according to claim 6, wherein if the first level is a level two, the second right-edge horizontal coordinate is equal to the first left-edge horizontal coordinate or the second left-edge horizontal coordinate is equal to the first right-edge horizontal coordinate; and if the first level is inferior to the level two, the second right-edge horizontal coordinate is smaller than the first left-edge horizontal coordinate or the second left-edge horizontal coordinate is greater than the first right-edge horizontal coordinate.

8. The display apparatus according to claim 1, wherein the controller is configured to:

if the prompt information includes both a picture and text, present the picture during presentation first.

9. The display apparatus according to claim 1, wherein the controller is configured to:

if the prompt information includes both a picture and text, present the picture above the text during presentation.

10. A method for a display apparatus comprising a display, wherein the method comprises:

reading a first position in response to a command for moving a focus frame, wherein the first position indicates a position of a control where the focus frame is about to move towards;

generating a second position based on information of the first position, wherein the first position and the second position are related; and controlling the display to present prompt information of a first control at the second position, wherein the first control is the control where the focus frame is about to move towards;

wherein the first position comprises a first left-edge horizontal coordinate indicating a horizontal coordinate of a left edge of the first position and a first right-edge horizontal coordinate indicating a horizontal coordinate of a right edge of the first position; and if a current language of the display apparatus is a first language, the control is displayed on a left side of a presentation interface of the display, and if the current language of the display apparatus is a second language, the control is displayed on a right side of the presentation interface; wherein the method further comprises:

in response to the current language being set as the first language, generating the second position having a second left-edge horizontal coordinate greater than or equal to the first right-edge horizontal coordinate, wherein the second left-edge horizontal coordinate indicates a horizontal coordinate of a left edge of the second position; and in response to the current language being set as the second language, generating the second position having a second right-edge horizontal coordinate smaller than or equal to the first left-edge horizontal coordinate, wherein the second right-edge horizontal coordinate indicates a horizontal coordinate of a right edge of the second position.

11. The method according to claim 10, wherein the method further comprises:

reading a first ID, where the first ID is for indicating a control ID of the first control;

determining a first level of the first control based on the first ID; and not reading the first position in response to the first level being a level one.

12. The method according to claim 11, wherein each control is configured with an information list where prompt information of the control is stored; and the method further comprises:

in response to the first level being not the level one, reading the prompt information from a target information list, wherein the target information list is the information list of the first control; and not reading the first position in response to the prompt information being not obtained.

13. The method according to claim 12, wherein the method further comprises: in response to the prompt information being obtained, if the first level is different from a second level of a second control, controlling the display to play a level-change animation-, wherein the focus frame is moved from the second control to the first control in response to the command for moving the focus frame; and reading the first position in response to ending of playing of the level-change animation; and if the first level is the same as the second level, reading the first position.

14. The method according to claim 13, wherein the first position further comprises a first top vertical coordinate indicating a vertical coordinate of a top edge of the first position, a first bottom vertical coordinate indicating a vertical coordinate of a bottom edge of the first position, and a first central vertical coordinate indicating a vertical coordinate of a center of the first position; the presentation interface of the display has a center with a second central vertical coordinate; wherein the method further comprises:
- in response to the first central vertical coordinate being greater than or equal to the second central vertical coordinate, generating the second position having a second top vertical coordinate equal to the first top vertical coordinate, wherein the second top vertical coordinate indicates a vertical coordinate of a top edge of the second position; and
- in response to the first central vertical coordinate being smaller than the second central vertical coordinate, generating the second position having a second bottom vertical coordinate equal to the first bottom vertical coordinate, wherein the second bottom vertical coordinate indicates a vertical coordinate of a bottom edge of the second position.

15. The method according to claim 14, wherein the first position further comprises a first central horizontal coordinate indicating a horizontal coordinate of the center of the first position; and the center of the presentation interface of the display has a second central horizontal coordinate; wherein the method further comprises:
- in response to the first central horizontal coordinate being greater than the second central horizontal coordinate, generating the second position having a second right-edge horizontal coordinate smaller than or equal to the first left-edge horizontal coordinate, wherein the second right-edge horizontal coordinate indicates a horizontal coordinate of a right edge of the second position; and
- in response to the first central horizontal coordinate being smaller than the second central horizontal coordinate, generating the second position having a second left-edge horizontal coordinate greater than or equal to the first right-edge horizontal coordinate, wherein the second left-edge horizontal coordinate indicates a horizontal coordinate of a left edge of the second position.

16. The method according to claim 15, wherein if the first level is a level two, the second right-edge horizontal coordinate is equal to the first left-edge horizontal coordinate or the second left-edge horizontal coordinate is equal to the first right-edge horizontal coordinate; and
- if the first level is inferior to the level two, the second right-edge horizontal coordinate is smaller than the first left-edge horizontal coordinate or the second left-edge horizontal coordinate is greater than the first right-edge horizontal coordinate.

17. The method according to claim 10, wherein the method comprises:
- if the prompt information includes both a picture and text, presenting the picture during presentation first.

18. The method according to claim 10, wherein the method comprises:
- if the prompt information includes both a picture and text, presenting the picture above the text during presentation.

* * * * *